(12) United States Patent
McClain

(10) Patent No.: US 10,987,883 B2
(45) Date of Patent: Apr. 27, 2021

(54) GLASS REPAIR KIT AND METHOD

(71) Applicant: Patrick McClain, Houston, TX (US)

(72) Inventor: Patrick McClain, Houston, TX (US)

( * ) Notice: Subject to any disclaimer, the term of this patent is extended or adjusted under 35 U.S.C. 154(b) by 0 days.

(21) Appl. No.: 16/388,023

(22) Filed: Apr. 18, 2019

(65) Prior Publication Data

US 2019/0240935 A1 Aug. 8, 2019

Related U.S. Application Data

(63) Continuation-in-part of application No. 15/637,373, filed on Jun. 29, 2017, now Pat. No. 10,946,624.

(51) Int. Cl.
*B29C 73/02* (2006.01)
*B32B 17/10* (2006.01)
(Continued)

(52) U.S. Cl.
CPC .......... *B29C 73/025* (2013.01); *B29C 73/163* (2013.01); *B29C 73/166* (2013.01); *B32B 17/10963* (2013.01); *B29C 65/4845* (2013.01); *B29C 65/525* (2013.01); *B29C 73/30* (2013.01); *B29C 2035/0827* (2013.01); *B29L 2031/3052* (2013.01)

(58) Field of Classification Search
CPC . B32B 17/10963; B29C 73/02; B29C 73/025; B29C 73/24; B29C 65/4845; B29C 65/483; B29C 65/52; B29C 65/524; B29C 65/525; B29C 65/4825; B29C 65/50; B29C 65/5057; B29C 65/76; B29C 73/163; B29C 73/166; B29C 73/30; B29C 2035/0827; B29L 2031/3052; A45D 34/04; B65D 75/00; B65D 75/52; B65D 75/26; B65D 75/32; B65D 75/325; B65D 75/326; B65D 75/36; B65D 75/366; A61M 35/003; A61M 35/006; B05C 17/00583
USPC ..... 156/60, 94, 98, 145, 146, 196, 210, 242, 156/245, 247, 249, 272.2, 275.5, 275.7, 156/290, 291, 292, 295, 332, 701, 714, 156/719; 222/92, 105, 107, 541.1, 541.3, 222/541.4, 541.6, 541.9; 206/484, 484.2, 206/469, 461, 467; 220/260, 265, 266, 220/267, 276; 428/63; 425/11, 12, 13; 401/132, 133, 183, 184, 185, 134, 135; 264/36.1, 36.21, 36.22
See application file for complete search history.

(56) References Cited

U.S. PATENT DOCUMENTS

| 4,084,910 A | 4/1978 | LaRosa |
| 4,200,478 A * | 4/1980 | Jacino ..................... B29C 73/00 156/94 |

(Continued)

*Primary Examiner* — Philip C Tucker
*Assistant Examiner* — Brian R Slawski
(74) *Attorney, Agent, or Firm* — Thomas D. Nash

(57) ABSTRACT

A portable glass repair kit system and method, more particularly, for windshield repair for laminated glass and the like to provide an easy to use, highly portable, and economical glass repair kit. The glass repair kit does not require specialized equipment such as an injector, plugger device, suction cups, or require any additional tools or specialized knowledge of how to use the repair kit. The glass repair kit contains a resin which may be urged by a user through slight pressure after the glass repair kit is adhered over an impact point and any cracks thereby repairing a windshield in a more cost effective, time efficient, and user friendly way.

20 Claims, 17 Drawing Sheets

(51) Int. Cl.
*B29C 73/16* (2006.01)
*B29L 31/30* (2006.01)
*B29C 73/30* (2006.01)
*B29C 35/08* (2006.01)
*B29C 65/48* (2006.01)
*B29C 65/52* (2006.01)

(56) References Cited

U.S. PATENT DOCUMENTS

| | | | |
|---|---|---|---|
| 4,753,695 A * | 6/1988 | Alexander | B29C 73/025 156/94 |
| 4,919,603 A * | 4/1990 | Herold | B29C 73/025 425/12 |
| 4,961,883 A * | 10/1990 | Jacino | B29C 73/025 156/382 |
| 5,156,853 A | 10/1992 | Werner | |
| 6,074,582 A * | 6/2000 | Jacino | B29C 73/025 264/36.21 |
| 2006/0113318 A1 | 6/2006 | May | |
| 2012/0055611 A1* | 3/2012 | Berndt | B32B 17/10963 156/94 |

* cited by examiner

GLASS REPAIR KIT AND METHOD

BACKGROUND OF THE INVENTION

Field of the Invention

The present invention relates generally to portable glass repair kit systems and, more particularly, to a glass repair kit for windshield repair for laminated glass.

Background of the Invention

Vehicle windshields must be resilient enough to withstand constantly being struck with tiny pebbles, sand, gravel, and other such road debris. Therefore, modern vehicles are equipped with laminated glass. Laminated glass is a type of safety glass which does not completely shatter into dangerous shards upon impact. Laminated glass is formed from two or more thin sheets of tempered glass that are fused to a rubber or plastic central layer, typically of polyvinyl butyral (PVB) or ethylene-vinyl acetate (EVA). The outer layers are independent, one on the outside of the vehicle and one on the inside of the vehicle. The central layer acts by absorbing the shock from an impact and reduces the chance of breakage from small particles such as pebbles or the like.

If an object strikes the windshield glass with sufficient force, a chip or crack may be formed. However, the chip is usually localized to only the outer layer of glass. The inside layer of glass within the vehicle is protected from breaking due to the central membrane absorbing the shock of the impact and thereby mitigating further damage to the inside layer of glass. Windshield repair is a viable solution to repair the rock chips that have damaged the outer layer of the glass and prevent further damage, such as cracks spreading from the chip, causing irreparable harm. When done properly, the strength and clarity is sufficiently restored for most safety related purposes.

Prior art glass repair systems are typically complicated involving expensive specialized tools which are not intuitive to operate. These systems advantageously fill cracks or chips in windshields caused from rocks, debris, or other impacts causing damage. Unrepaired damage eventually may permanently damage the windshield as water permeates the layers of glass, causing condensation and decreasing visibility. This may lead to the entire windshield structure being compromised to the point of requiring replacement. Commercial repair kits utilize a special resin which is injected into the center of the chip by first removing moisture, dirt, foreign matter, loose glass, and contamination from the damaged area. The damaged area may then be accessed through probing or drilling to reach the central layer. Resin is then injected using a specialized tool such as a bridge type holding structure having a metal structure with an injector secured to the windshield by suction cups, which offers leveraging and mechanical advantage. The holding structure or bridge holds the injector in place while repairing the damage. The structure controls both pressure on the resin injection and pressure on the glass so that the resin will efficiently fill the crack or chip. After which a vacuum is used to remove air and apply pressure causing the resin to spread and fill the cracks extending from the center of the chip. It is sometimes desirable to be able to quickly repair cracks or chips without the need of visiting a repair center. Repair centers may not be close to a driver's location, open at the time, or may also require a separate visit leading to increased time, effort, and costs.

There exists a need for a glass repair kit that is easy to use for one with little or no skill in repairing windshields, highly portable, and very economical. Consequently, those skilled in the art will appreciate the present invention.

SUMMARY OF THE INVENTION

A primary object of the present invention is to provide an easy to use glass repair kit for users who have little or no skill in window repair, is highly portable, and is economical.

Another object of the present invention is to provide a glass repair kit which does not require specialized equipment such as an injector, plugger device, suction cups, or the like.

Still another object of the present invention is to provide a glass repair kit that does not require any additional tools or training other than instructions of how to use the repair kit.

One general aspect includes a glass repair kit to repair an impact point in safety glass, including a housing. The housing including a wall and a bottom surface. The wall extends from the bottom surface where in operation after placement of the housing on the safety glass then the bottom surface is adjacent the safety glass. The glass repair kit also includes an adhesive operable to adhere the bottom surface to the safety glass. A chamber is formed inside of the housing defined by the wall for placement adjacent the safety glass to permit resin to flow from the chamber to the safety glass through an opening. When the adhesive is adhered to the safety glass and the bottom surface then a seal is formed between the housing and the safety glass around the opening. The glass repair kit also includes a compression member to urge the resin into the impact point in the safety glass during operation of the glass repair kit. The resin is operable to flow into the impact point and cure in response to UV light. The glass repair kit also includes a UV shield for the compression member. The UV shield is operable to block transmission of UV light to the resin within the chamber.

Implementations may include one or more of the following features: the compression member is separable from the housing. The housing may be rigid. The housing is operable for transmission of UV light through the housing. The glass repair kit further including the compression member may be rigid and fit around the housing. The UV shield is removable from the housing. When the UV shield is removed, then UV light is capable of transmission through the housing and into the chamber. The UV shield is formed on the compression member. The compression member is removable from the housing. The glass repair kit further includes a container configured to be housed within the chamber where the container contains the resin within. The container is operable to allow transmission of UV light through the container. The chamber is compressible. The container is compressible to release the resin upon compression. The resin is operable to flow from the container and urged into the impact point of the safety glass through the opening. The glass repair kit further including the container may be a capsule, the capsule being operable to be inserted into the housing. A bar is mounted in the chamber. The bar being engageable with the container to release the resin upon contact with the bar in response to movement of the compression member. The bar includes raised members. The raised members protrude from the bar. The raised members are configured to pierce the container. The glass repair kit further including the compression member includes at least one internal compression component. The at least one internal compression compo- nent being positioned to guide the container to contact the bar during compression. The at least one internal compression component being insertable to the chamber. The at least one internal compression component is operable to provide compression to the container on an opposite of the bar.

One general aspect includes the at least one internal compression component includes two internal compression components. The two internal compression components having a length substantially the length of the bar. The two internal compression components being positioned parallel relative the bar and spaced to accept the bar between the two internal compression components upon compression. The two internal compression components have a top surface which is angled between zero and thirty five degrees relative each end of each the two internal compression components. The top surface of the two internal compression components including ridges operable to pierce the container upon compression.

One general aspect includes a method of providing a glass repair kit to repair an impact point in safety glass. The method includes providing a housing with a top surface and a bottom surface where in operation after placement of the housing on the safety glass then the bottom surface is adjacent the safety glass and the top surface is distal the safety glass. The housing includes a wall. Adhesive is provided to adhere the bottom surface to the safety glass. A chamber is formed within the housing. The chamber is defined by the wall. The chamber is placed adjacent the safety glass to permit resin to flow from the chamber to the safety glass. The method of also includes positioning the resin inside the chamber. The adhesive is positioned on the bottom surface around an opening in the bottom surface where when the adhesive is adhered to the safety glass and the bottom surface then a seal is formed between the housing and the safety glass around the opening. A compression member is provided to urge the resin into the impact point in the safety glass during operation of the glass repair kit. The resin being operable to flow into the impact point through the opening and cure in response to UV light. A UV shield is provided for the chamber. The UV shield being operable to block transmission of UV light to the resin within the chamber.

Implementations may include one or more of the following features: the method further including providing that the housing and the wall may be rigid. The wall extends from the bottom surface. The compression member may be separable from the housing. The method further including providing a container. The container is positioned within the chamber where the container contains the resin within. When the chamber is compressed, the container is also compressed where the resin is urged into the impact point of the safety glass through the opening. The method further includes a bar in the wall. The bar spans the length of the wall along an axis. The bar may be centered relative to the wall. The bar is in communication with the compression member during operation whereupon the compression member engages the container releasing the resin upon contact with the bar. The method further including providing the bar includes raised members. The raised members protrude from the bar. The raised members are configured to pierce the container. The method further including providing the compression member includes at least one internal compression component. The at least one internal compression component is positioned to guide the container where the container engages the bar during compression. The method further including providing the at least one internal compression component includes two internal compression components. The two internal compression components have a length substantially the length of the bar. The two internal compression components are positioned parallel relative the bar and spaced to accept the bar between the two internal compression components upon compression. The two internal compression components have a top surface angled between zero and thirty five degrees relative each end of each the two internal compression components. The top surface of the two internal compression components include ridges operable to pierce the container upon compression. The method may also include providing that the compression member is rigid. The compression member is placed onto the housing where the compression member fits around the housing. The method further including providing that the compression member includes the UV shield. When the compression member is removed then the UV light is capable of transmission through the housing and into said chamber.

These and other objects, features, and advantages of the present invention will become clear from the figures and description given hereinafter. It is understood that the objects listed above are not all inclusive and are only intended to aid in understanding the present invention, not to limit the bounds of the present invention in any way.

Figure 1:
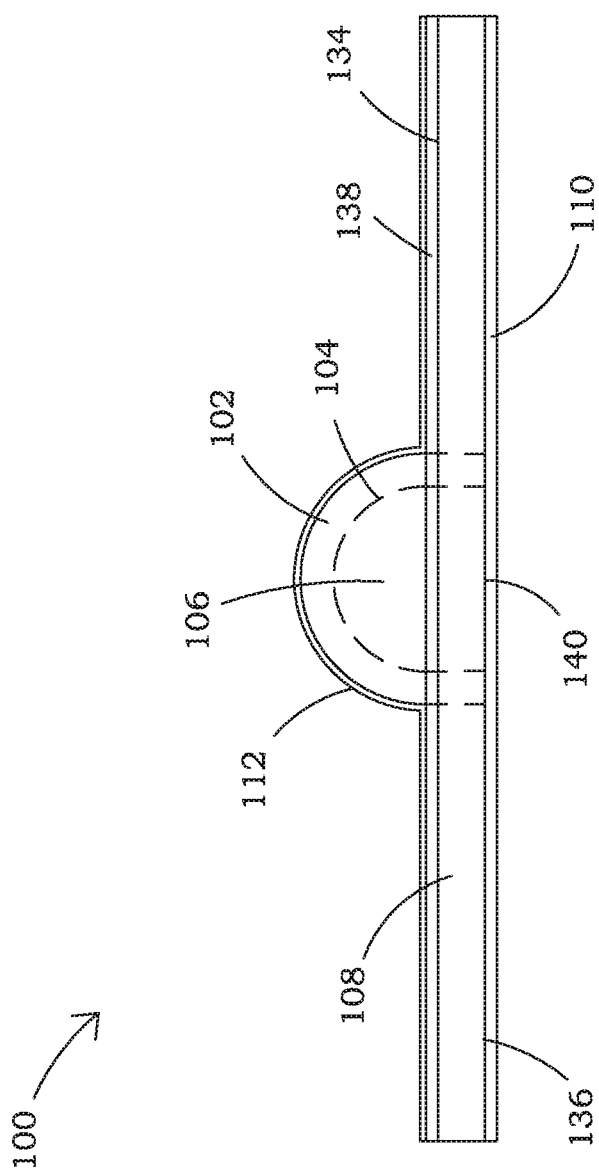
FIG. 1 is a side view showing a glass repair kit in accord with one possible embodiment of the present invention.

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring now to the drawings and more specifically to FIG. 1, is a side view showing a glass repair kit in accord with one possible embodiment of the present invention. Glass repair kit 100 comprises a housing 108 providing sufficient rigidity and a structure for glass repair kit 100 although the housing and/or components thereof may be bendable as necessary for any curves in a windshield. Housing 108 is generally square shaped, however other shapes may be used such as circular, rectangular, or the like depending on the application and shape of the damage to a vehicle's windshield. In a preferred embodiment, housing 108 is formed of a thin, flexible foam. Any other suitable material may be used such as other plastics, foam, rubber, double sided tape, or the like that is still able to remain rigid enough to support the housing from becoming overly flexible or loose and maintain a substantially flat configuration. Housing 108 could be thicker so that pocket 102 does not extend therefrom.

In this embodiment, housing 108 comprises a top surface 134 and a bottom surface 136. Housing 108 is configured with a central portion capable of retaining porous material 104. Centered within housing 108 is an opening 140 which may be generally circular or other suitable shape depending on the application. The opening could also be configured with perforations or the like that are broken during operation to allow the resin to flow into the glass as discussed herein. The resin is UV (ultraviolet) sensitive so that it begins to harden after being exposed to UV light. UV sensitive resin is readily available and has been used in the prior art for years to fix windshields. In one possible embodiment, adhered to the top surface 134 is a film 138. Film 138 may be vacuum sealed onto housing 108 over porous material 104 thereby creating a pocket 102 retaining porous material 104 within the housing 108. A flexible dome or hemisphere may be created forming the pocket 102 when the film 138 is vacuum sealed to the housing 108. A mold or other means of forming pocket 102 may also be used. Both the film and porous material may therefore be flexible. Pocket 102 may be comprised of flexible, compressible material. Pressing on the pocket 102, which may be a dome shape and created by the flexible film, may then be used to urge or inject the resin into the windshield 124. In one possible embodiment, film 138 may be configured to act as UV shield 112 and therefore a separate UV shield may be omitted. Therefore, film 138 may be opaque and act as a UV shield to block UV light from entering into pocket 102. In another possible embodiment, film 138 may be transparent or translucent and configured to allow UV light to penetrate into a pocket 102, therefore would require a separate UV shield placed over film 138 to block UV light.

In one possible embodiment in which film 138 acts as UV shield 112, film 138 may be permanently adhered to top surface 134. UV light would be blocked from interacting with resin 106 until removal of glass repair kit 100. This would allow resin 106 to flow freely throughout an impact point and cracks to prevent resin 106 from curing prematurely. To completely fill the damaged area may take approximately 5-10 minutes. Once the damaged area has been completely filled in with resin, glass repair patch or kit 100 may be removed. Upon interaction with UV light, resin 106 may cure relatively quickly, for example in 5-10 minutes, making it important to prevent light from penetrating through UV shield 112.

In another possible embodiment, film 138 may be transparent to be configured to allow transmission of UV light into said pocket 102 after removal of a UV shield 112, which is positioned over film 138. In this embodiment, a removable UV shield 112 covers the entire housing. Removable UV shield 112 may be adhered above film 138 and entirely shields pocket 102 from transmission of ultraviolet (UV) light. UV shield 112 may be flexible and removable by peeling apart relative top surface 134 of housing 108.

In another embodiment, the housing may be retained in a UV shielded package, sack, or the like that blocks UV light prior to and during usage so that the housing 108 or pocket 102 does not require a separate removable UV shield mounted to the housing. In another embodiment, removable UV shield 112 may be placed over the pocket 102 only rather than the entire housing 108.

In a preferred embodiment, porous material 104 may be for example a sponge which is placed in the opening 140 of housing 108 whereby when film 138 is vacuum sealed on the top surface 134 of the housing a pocket 102 is formed. Film 138 may be adhered to top surface 134 sealing porous material 104 within housing 108. In another embodiment, porous material 104 may be a sponge, breakable capsule, or other like permeable device operable to retain resin 106 and urge resin during compression. As discussed herein when flexible pocket 102 is compressed then the resin 106 is forced into the impact point 118 or cracks 120 of the glass. In other words, when flexible pocket 102 is compressed, porous material 104 is compressed secreting resin 106 which may be urged or injected through opening 140 into impact point 118 (See FIG. 6) of glass surface 124, which may also be referred to as a windshield or safety glass. In another possible embodiment, a capsule is configured to be housed within pocket 102 wherein the capsule contains resin 106 within. When pocket 102 is compressed, the capsule is also compressed breaking the capsule open whereby resin 106 is urged or injected through opening 140 into impact point 118 of windshield or glass surface 124. In a preferred embodiment, flexible pocket 102 may protrude generally upward relative to top surface 134 and is sufficiently sized to contain adequate porous material 104 within.

In another embodiment, pocket 102 may remain flush with top surface 134 and be flexible or otherwise compressible to allow compression of pocket 102. For example, pocket 102 could be a cylinder and the top of the pocket, which might be a rigid disk, could act as a piston to compress resin into an impact point. In this embodiment, resin may be stored with or without a permeable material or may simply be placed in the cylinder and may or may not comprise any additional non-porous container such as a capsule. Pocket 102 may also be referred to as flexible pocket or compressible pocket 102.

Figure 9:
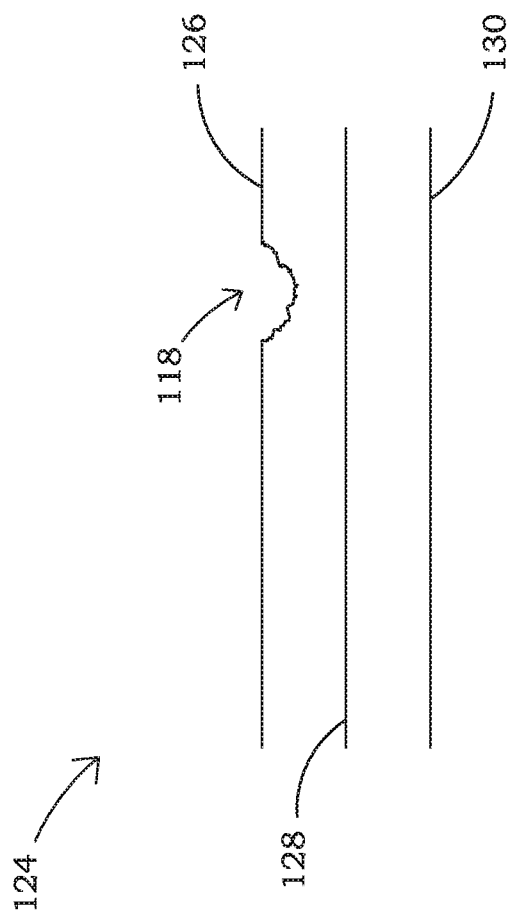
FIG. 9 is a side cross-sectional view showing an impact point of a windshield damaging the outer layer of glass while the inner layer of glass is undamaged in accord with one possible embodiment of the present invention.
Figure 10:
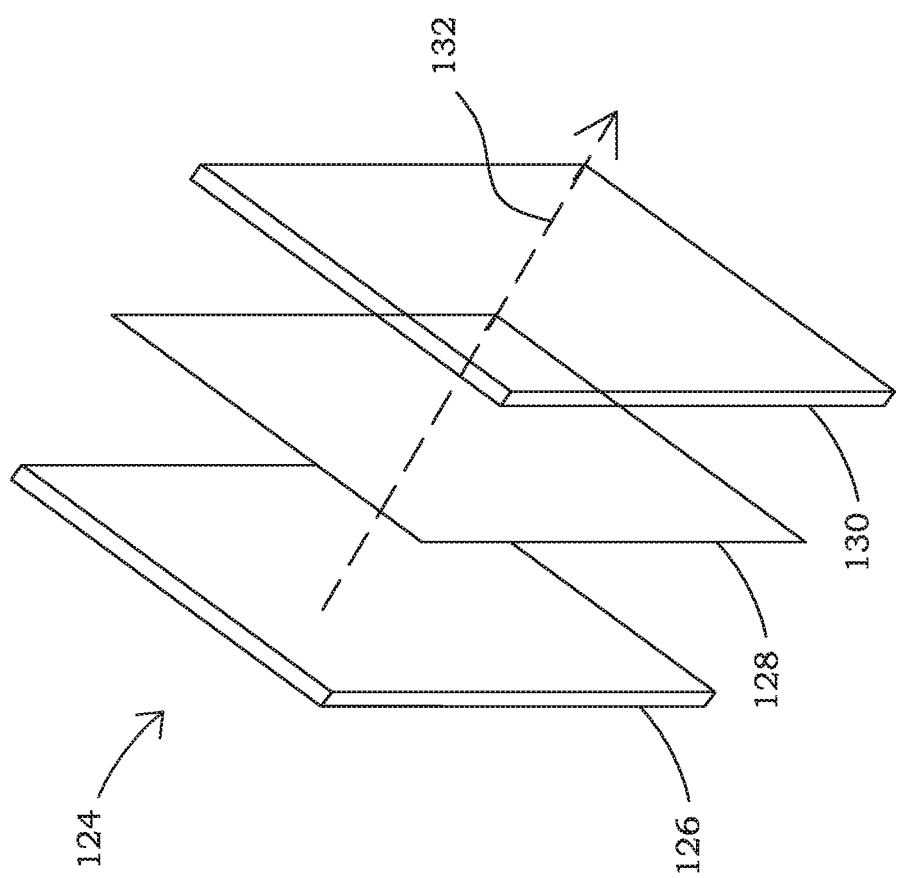
FIG. 10 is an exploded perspective view showing the various layers of laminated windshield glass with light passing therethrough in accord with one possible embodiment of the present invention.

In the embodiment shown in FIG. 1, porous material 104 contains resin 106, which is used to repair the outer layer 126 of safety glass (See FIGS. 9 and 10). Porous material 104 provides the benefit of retaining resin 106 inside thereby mitigating inadvertent leaks or spilling when backing 110 is removed. Resin 106 is of a type that has been used in the industry for years to repair windshields.

In one embodiment, backing 110 may be adhered to bottom surface 136 and seals opening 140 and pocket 102 from being introduced to outside air as well as stopping resin 106 from desiccation prior to use of glass repair kit 100. Adhesive for backing 110 may be sticky but allow removal of backing 110 as discussed below wherein the same adhesive can then be used to adhere housing 108 to the windshield. However, if desired other arrangements such as separate adhesive could be used. Backing 110 may also be secured to bottom surface 136 without adhesives such as by sliding on, snapping on, or the like. Backing 110 is operable to block transmission of UV light from penetrating through opening 140 and into pocket 102. Backing 110 may be flexible and removable by peeling apart from housing 108. In another embodiment, backing 110 may be perforated in an area relative to opening 140. Upon applied pressure to pocket 102, the perforations would break allowing resin 106 to be released through opening 140.

An exemplary embodiment may be comprised of housing 108 formed from high bond double sided acrylic foam tape with an opening 140 created in the center. A porous material 104, such as a sponge, may be inserted into the opening 140. The porous material retains resin 106 within. A film 138 may be vacuumed formed onto top surface 134 and adhered due to an adhesive on both the top and bottom of the housing 108. As film 138 is vacuum formed, a pocket 102 is formed over porous material 104. A backing 110 may be placed on the bottom surface 136 and adhered due to adhesive 114. In this embodiment, the housing remains flexible, lightweight, and relatively thin. Additionally, the adhesive on the bottom surface can be used to both secure backing 110 to the housing and prevent interaction with other surfaces prior to use, as well as, in operation securing glass repair kit 100 to the windshield.

Figure 2:
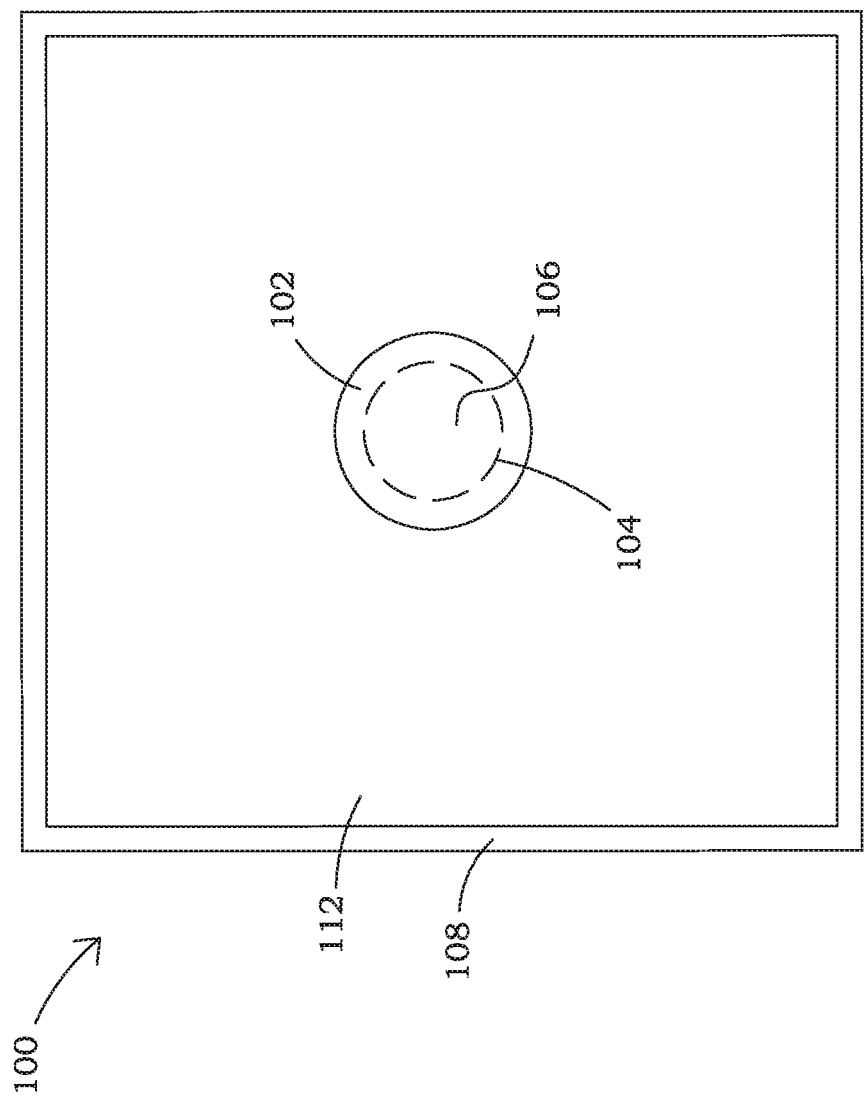
FIG. 2 is a top view showing a glass repair kit in accord with one possible embodiment of the present invention.

Referring to FIG. 2, a top view is shown of glass repair kit 100 in accord with one possible embodiment of the present invention. Glass repair kit 100 comprises UV shield 112 adhered to top surface 134 and may be opaque thereby increasing its ability to block the transmission of UV light into pocket 102. As shown in FIG. 2, pocket 102 may be substantially circular and centered relative to housing 108. UV shield 112 may completely cover pocket 102 increasing its ability to stop UV light from entering pocket 102 and interacting with resin 106 within porous material 104.

Referring also to FIG. 1, in another possible embodiment, film 138 is adhered to top surface 134 with a separate UV shield 112 placed over film 138. Film 138 may be transparent with an opaque UV shield adhered above. Upon removal of UV shield 112 or removal of the glass repair kit 100, UV light would then be able to interact with resin 106 to cure.

Figure 3:
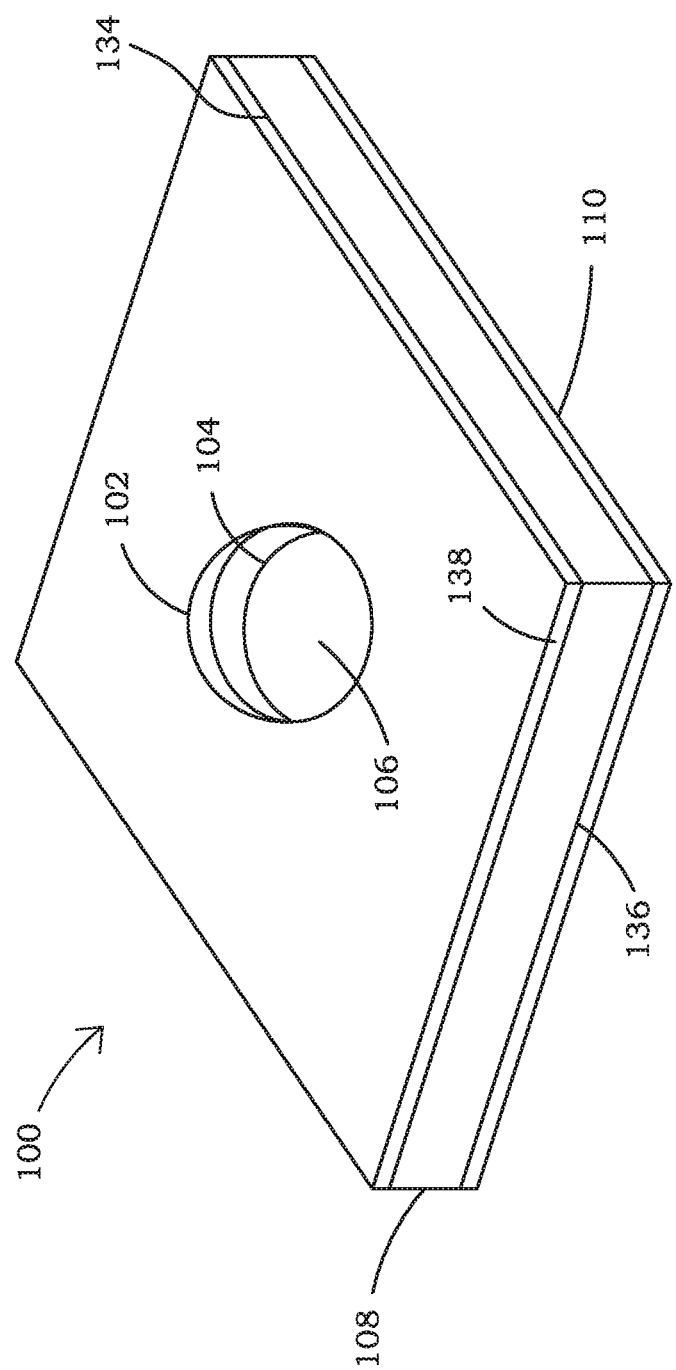
FIG. 3 is a perspective view showing a glass repair kit in accord with one possible embodiment of the present invention.

Referring to FIG. 3, a perspective view is shown of glass repair kit 100 in accord with one possible embodiment of the present invention. In this embodiment, UV shield 112 has been removed revealing film 138 and top surface 134 of housing 108. In this embodiment, film 138 may be transparent or opaque with a flexible pocket 102 which can be seen protruding upward relative housing 108 in a substantially dome or hemispherical shape. Other shapes of flexible pocket 102 can be used depending on the application, shape of opening 140, shape of porous material 104, or the like. Porous material 104, which contains resin 106, may be housed within pocket 102. Film 138 may be configured to be utilized as a UV shield wherein it may be opaque or other color operable to completely shield any light from prematurely curing resin 106, whereupon a separate shield 112 is not necessary.

In one embodiment, film 138 is preferably opaque and adhered to top surface 134. Film 138 may configured to not be removable, such that no incidental exposure of light may penetrate pocket 102. UV light reacts with resin 106 allowing resin 106 to harden after the resin flows through opening 140 and into impact point 118 and to the cracks 120 in the windshield. Resin 106 hardens generally quickly after exposure to UV light, such as in a few minutes.

In another embodiment, a separate UV shield 112 may be opaque and above film 138 which may be transparent. UV shield 112 may remain secured to housing 108 while resin 106 may flow into the damaged area. Upon resin 106 completely filling surface pits 118 and cracks 120, then UV shield 112 may be removed. Upon removal of UV shield 112, pocket 102 may be transparent to allow UV light to penetrate to porous material 104 and resin 106.

In another embodiment, a UV shield is used somewhere in housing 108 above pocket 102 and the entire housing 108 is removed in order to expose the resin to UV light.

Backing 110 may be adhered to bottom surface 136 by an adhesive 114. Adhesive 114 may be of a type that is very sticky and forms a seal between the housing and the windshield as discussed hereinafter but may remain soft and relatively removable during clean up. Adhesive 114 may be used to adhere backing 110 to bottom surface 136. Adhesive 114 may also be used to adhere bottom surface 136 to windshield 124 after removal of backing 110. Adhesive 114 may be of the type that does not set or harden, but rather remains pliable and sticky or viscid to secure glass repair kit 100 to a windshield during use but may remain pliable enough to be removed by a user without leaving residue on the windshield after removal of the glass repair kit. Leftover residue may impede a driver's view, therefore having an adhesive that does not leave residue upon removal decreases additional time and work while using glass repair kit 100. Also, it is advantageous to be able to use the same adhesive to secure backing 110 to the housing and also to use the same adhesive to secure the housing to the windshield. However, in other embodiments, adhesive may be applied separately or not at all. In some embodiments, glass repair kit 100 may be secured to the windshield by other means such as suction cups or the like. Other means may also be used to secure glass repair kit 100 to windshield 124 such as sealants, elastomeric seals, synthetic chemicals, cement, paste, glue, tape, epoxies, or the like. Such means to secure glass repair kit 100 to the windshield may also provide a means to provide a seal (for example see FIGS. 7 and 8) between bottom surface 136 and windshield 124 to prevent air from interacting with resin 106 creating bubbles or impeding flow as well as to prevent resin 106 from curing prior to completely filling the impact point and associated cracks.

Backing 110 comprises a material operable to block UV light penetration through opening 140 and into pocket 102. Backing 110 may be flexible and peeled off just prior to applying glass repair kit 100 to windshield or glass surface 124. Utilizing backing 110 as a means to retain adhesive 114 makes the kit easier to use without the need to separately apply adhesive.

Figure 4:
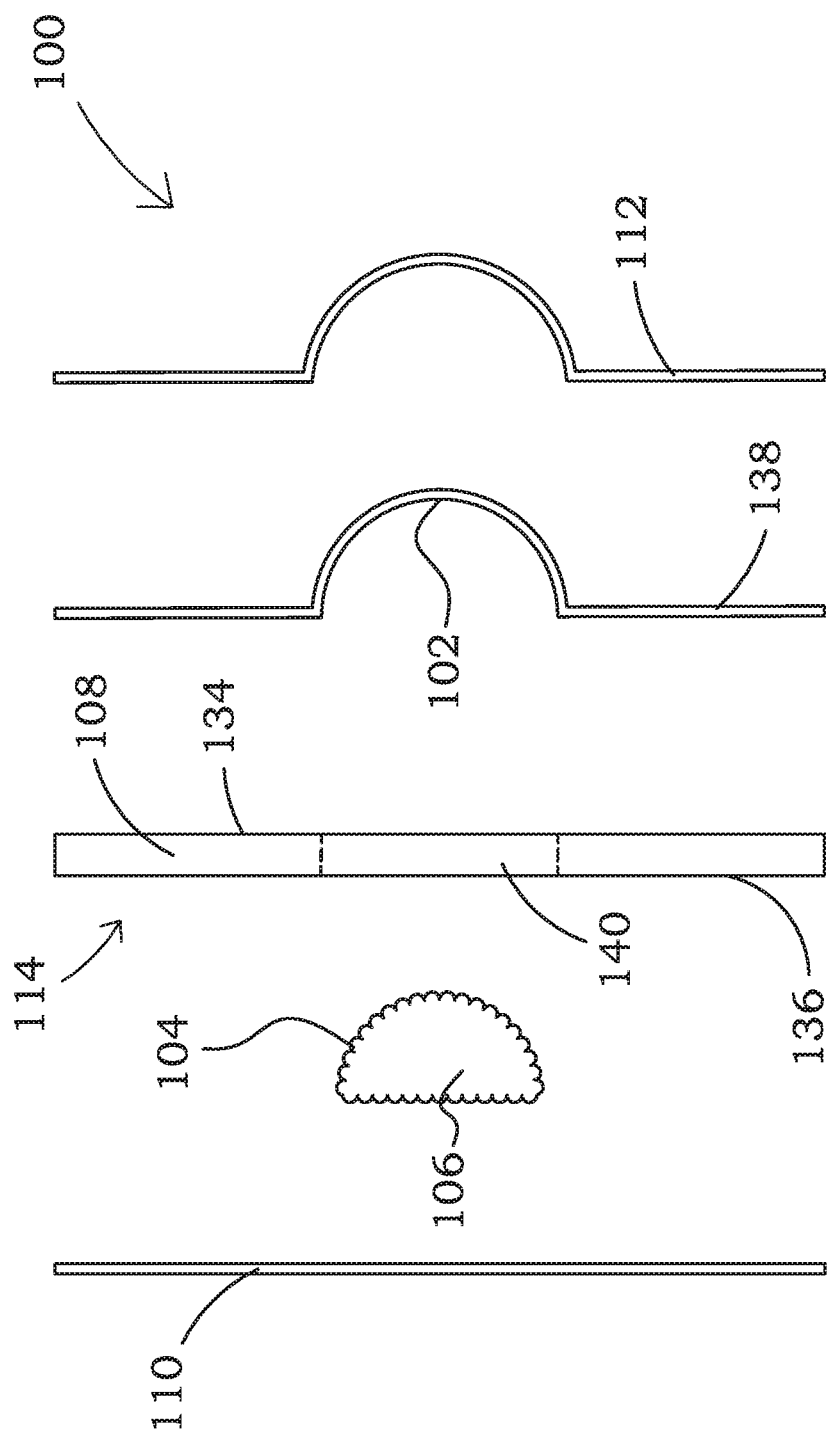
FIG. 4 is an exploded view showing a glass repair kit in accord with one possible embodiment of the present invention.

Referring to FIG. 4, an exploded view is shown of glass repair kit 100 in accord with one possible embodiment of the present invention. In one possible embodiment, glass repair kit 100 may comprise a backing 110. Backing 110 may be flexible plastic, rubber, or like material that is operable to block the transmission of UV light. Backing 110 may be adhered to bottom surface 136 of housing 108. Backing 110 may be removed from bottom surface 136 by peeling off or other like removal processes. During normal operation, removal of backing 110 generally may not expose bottom surface 136 and generally the contents within pocket 102 to sufficient UV light for activation of resin 106. Upon removal of glass repair kit 100 from the windshield, then sufficient UV light is allowed to cure the resin. In another possible embodiment, a separate UV shield 112 may be removed after placement of the kit 100 onto the window and complete saturation of resin 106 into the damaged area. The UV sensitive resin 106 is activated to harden once it receives UV light. The process from placing glass repair kit 100 and hardening may be complete after about 5 to 15 minutes.

As discussed previously, glass repair kit 100 may further comprise a porous material 104 within pocket 102. Porous material 104 may be a sponge, but may also be any other permeable material capable of retaining resin 106 within. In another possible embodiment, a capsule retaining resin 106 may be utilized wherein applied pressure is capable of breaking the capsule. Upon the capsule breaking, resin 106 may be released to flow. In one embodiment, the porous material and/or sponge may be selected to permit UV light flow therethrough once a removable UV shield is removed.

Housing 108 comprises a top surface 134 and a bottom surface 136. Housing 108 may be formed of a thermoplastic material utilizing a mold, however, other like materials such as other plastics, rubber, or the like that could be flexible yet sufficiently rigid to maintain support for the housing 108 from becoming overly flexible or loose and to maintain a substantially flat configuration. In one embodiment, bottom surface 136 may be coated with an adhesive 114 operable to adhere bottom surface 136 to windshield 124. While it would be possible to apply adhesive separately, in this embodiment, adhesive 114 is already in place on bottom surface 136 underneath backing 110. In one embodiment, bottom surface 136 may be substantially flat or slightly bendable to conform to the windshield. In another embodiment, bottom surface 136 may be curved or have other shapes that are still sufficiently operable to conform to the curvature of windshield 124. Centered in housing 108 and bottom surface 136 may be opening 140. In another possible embodiment, opening 140 may be comprised of a perforated material configured to open with the application of downward pressure. As shown in FIG. 4, opening 140 may be substantially circular, however any other shape may be used such as square, rectangular, or the like. In yet another embodiment, another compressible device may be utilized or formed within pocket 102 to inject or urge the resin.

During manufacture, porous material 104 may be inserted through opening 140 into pocket 102. Pocket 102 is sufficiently sized to retain porous material within housing 108. As shown in FIG. 4, pocket 102 may be generally cylindrical extending from opening 140 and extending upward to form generally a hemispherical or dome shape, however other shapes may be used. Backing 110 may seal porous material 104 within pocket 102. Pocket 102 comprises an air tight seal so as to maintain resin 106 within from premature desiccation. In a preferred embodiment, pocket 102 protrudes relative top surface 134 thus allowing a user 122 to easily locate the proper area in which to apply pressure. In another possible embodiment, pocket 102 may be entirely contained within housing 108 and be level relative top surface 134. Pocket 102 may also be recessed relative to housing 108.

Figure 5:
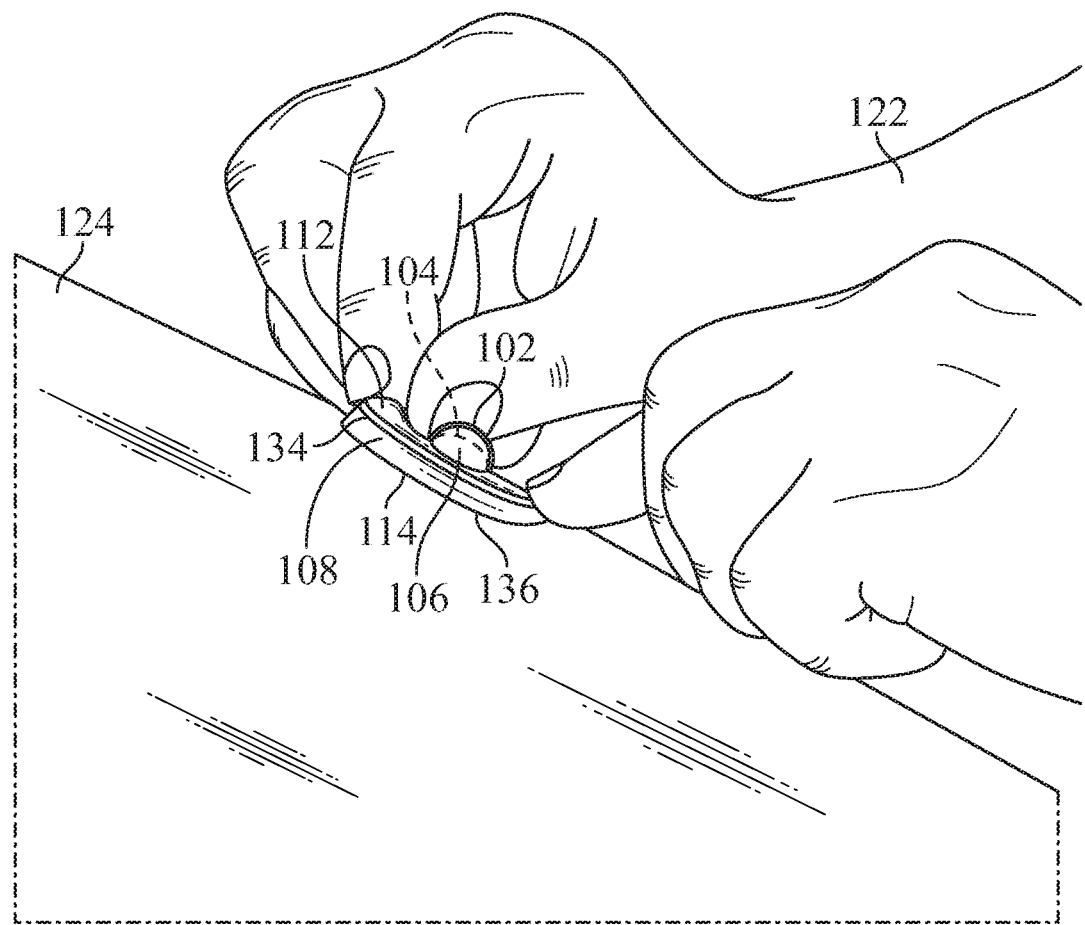
FIG. 5 is a perspective view showing a user placing a glass repair kit onto a damaged windshield in accord with one possible embodiment of the present invention.

Referring to FIG. 5, a perspective view is shown of user 122 placing glass repair kit 100 onto a damaged windshield in accord with one possible embodiment of the present invention. After preparing/cleaning the windshield or glass surface 124 by removing any excess glass or debris, user 122 may place glass repair kit 100 with pocket 102 directly over impact point or surface pit 118. In one possible embodiment, user 122 then removes or peels backing 110 from bottom surface 136 of housing 108. Bottom surface 136 comprises an adhesive 114 that may sufficiently adhere glass repair kit 100 to windshield 124. Adhesive 114 is operable to provide an air tight seal around impact point 118 and any cracks or legs 120. Adhesive 114 preferably forms a fluid tight seal around opening 140 so that all resin is forced into the cracks of the window when preferably flexible pocket 102 is compressed. User 122 need merely provide a slight downward pressure relative to windshield 124 along the entire periphery of glass repair kit 100. By creating an air tight seal, a vacuum is formed allowing resin 106 to flow from porous material 104 into impact point 118 and spread through any cracks 120 (See FIGS. 6 and 7) that may be present. In other words, higher pressure from the pocket forces the resin into any cracks or legs in the glass. In this embodiment, no additional tools or apparatus are necessary to place, align, orient, adhere, nor to create a vacuum relative to glass repair kit 100 and windshield 124.

Figure 6:
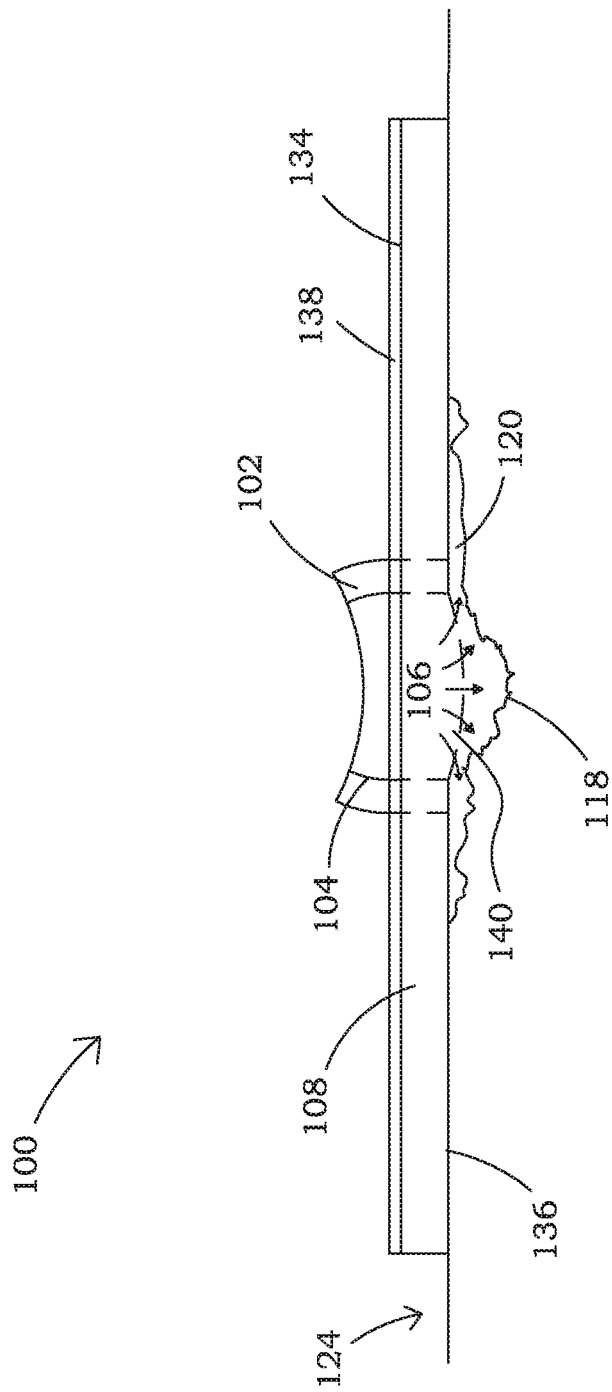
FIG. 6 is a side view showing a glass repair kit in which the pocket has been depressed to apply pressure on the porous material thereby releasing the resin into the damaged windshield in accord with one possible embodiment of the present invention.
Figure 7:
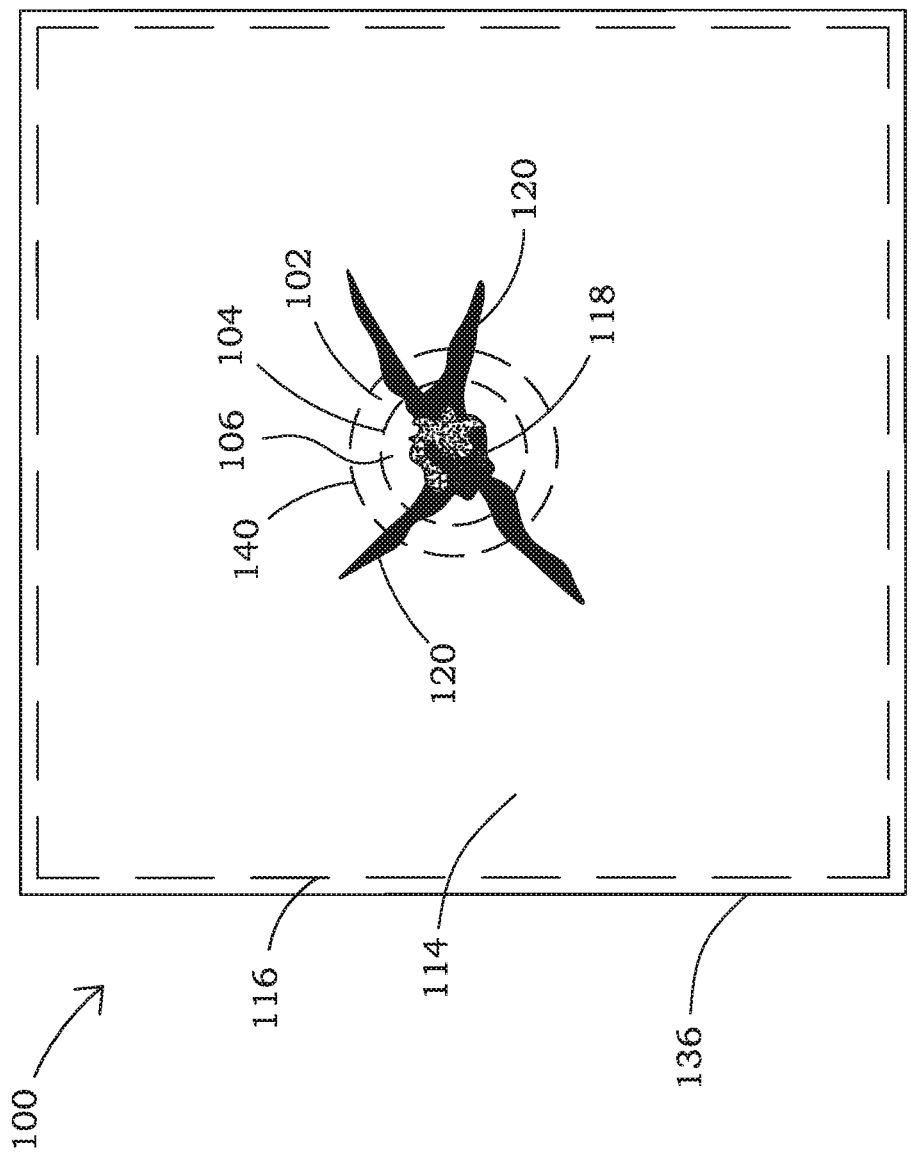
FIG. 7 is a bottom view showing a glass repair kit adhesively sealed and oriented above an impact point with cracks in a windshield in which the pocket has been depressed to apply pressure on the porous material thereby releasing the resin into the damaged windshield in accord with one possible embodiment of the present invention.

Opening 140 may be placed directly over impact point 118 so as to also align porous material 104 to be above the impact point 118 (See FIGS. 6 and 7). The remaining portion of bottom surface 136 may also be positioned or aligned to cover any cracks or legs 120 which emanate from impact point 118. Glass repair kit 100 is preferably sized to cover a damaged area of a windshield approximately 1.75" or less, however larger sized glass repair kits may be used. For example, the glass repair kit 100 or housing 108 may be from one to two inches in size, or may be from one to four inches in size, or may be from one to five inches in size, but may be larger or smaller.

UV light is required to cure resin 106, therefore UV shield 112 may be removed to allow UV light to penetrate into pocket 102 and interact with resin 106. UV shield 112 may be a thin, flexible plastic or other such material thereby allowing removal from housing 108. UV shield 112 may be removed by peeling from top surface 134 of housing 108. In an embodiment with a removable UV shield, UV shield 112 may be removed after resin 106 has had sufficient time to flow throughout the impact point and cracks. In another embodiment, UV shield is not removable, but rather bonded to housing 108. The entire apparatus may be removed after the resin has filled in the damaged area in order to allow UV light to be transmitted to 106 resin to cure.

Referring to FIG. 6, a side view is shown of glass repair kit 100 in which the pocket 102 has been depressed to apply pressure on porous material 104 thereby releasing the resin 106 into the impact point 118 of a damaged windshield 124 in accord with one possible embodiment of the present invention. For this reason, pocket 102 has a generally concave or collapsed top after compression. The user may compress pocket 102 using their thumb or other fingers.

Housing 108 may be adhered to windshield 124 by adhesive 114 (see, for example, FIG. 4 or 5) which may be coated to bottom surface 136. Other means of securing housing 108 to windshield may also be used as discussed previously. Housing 108 may be flexible and operable to conform to the curvature of windshield 124. Adhesive 114 may be adhered to windshield 124 through slight pressure applied by a user 122 around the periphery of housing 108 whereby the adhesive is sufficient to seal off any air from entering into the impact point 118 or any crack 120 which emanates therefrom. This is highly beneficial and eliminates the need for additional tooling typically required in commercial repair centers. The user will preferably press housing 108 from the top all around pocket 102 to make sure that adhesive 114 seals completely around pocket 102 and opening 140.

Once a seal is formed around pocket 102 and opening 140, and preferably over the entire bottom surface 136 of housing 108, with adhesive 114, a user 122 may apply pressure to compress pocket 102 whereby porous material 104 is also compressed. Due to the seal which prevents resin from flowing elsewhere, the resin 106 contained within porous material 104 will then flow through opening 140 and into impact point 118. A relative vacuum, or flow from higher pressure to lower pressure, created by the air tight seal from adhering glass repair kit 100 to windshield 124 further allows resin 106 to flow freely through any remaining cracks or legs 120. When compared to a typical commercial repair center that requires additional heavy tooling, a decreased amount of pressure is required to be applied to windshield 124 thereby mitigating any further damage or cracking from occurring. Greater pressure is often required when utilizing commercial tools and creates a risk of a crack "running" which increases damage, time, and costs associated with repairing a windshield.

As discussed herein, in one possible embodiment, UV shield 112 may be removed from top surface 134, preferably after housing 108 is adhered to windshield 124 and the resin has flowed into the damaged area. Removable UV shield 112 may be a thin, flexible material such as plastic or rubber which may be adhered to top surface 134. UV shield 112 may be peeled off or other like means to be removed from top surface 134 thereby exposing pocket 102 to UV light. UV light is transmitted into pocket 102, through opening 140, and reacts with resin 106 to begin the curing process. Resin 106 may typically cure within approximately 5 to 10 minutes, but may require more or less time as the size of the impact point and cracks are increased or decreased.

In another embodiment, UV shield 112 not be removable but rather may be bonded to top surface 134 of the housing. After user 122 has compressed pocket 102, resin 106 will be urged into the impact point and cracks due to the compression and pressure differential of the vacuum created by the seal 116 from the adhesive 114 between bottom surface 136 and windshield 124. After allowing the resin 106 to flow, user 122 may remove glass repair kit 100 as described below.

In one embodiment, after sufficient time has passed to allow resin 106 to flow, a user 122 may remove glass repair kit 100 by peeling, scraping, or other like means from windshield 124. User 122 may then visually inspect the repair to determine that the impact point and cracks have been sufficiently repaired. A user 122 may also physically inspect the repair such as by carefully running their finger over, using a scraper or flat edge, or other like means to ensure an acceptable repair. In one embodiment, glass repair kit may include a receptacle containing additional resin, scraper, and transparent film such as tape. In the event user 122 determines a repair is not sufficient, such as cracks remain visible or the resin is not even relative to the outer layer 126 of the glass, user 122 may utilize the receptacle to place additional resin. Typically only one drop of resin is necessary, but may be more, for the area that has been determined to be insufficient. After which, clear film or tape may be placed over the area to create an air tight seal and allow the additional resin to flow into the cracks. UV light may then react with the additional resin to cure. Curing time may typically range from a few seconds to 5-10 minutes, but more time may be necessary depending on the size of the remaining damage area. After sufficient time has passed, user 122 may then remove the clear film by peeling and/or utilizing a scraper to remove any leftover adhesive or excess resin to create a smooth surface relative outer layer 126.

Referring to FIG. 7, a bottom view is shown of glass repair kit 100 adhesively adhered and oriented above an impact point 118 with cracks 120 in a windshield 124 creating an air tight seal 116 in which the pocket 102 has been depressed in accord with one possible embodiment of the present invention. At a minimum, the air tight seal 116 surrounds opening 140. This is done to apply pressure on the porous material 104 thereby releasing the resin 106 into the damaged windshield. One possible type of damage is shown comprising an impact point with cracks emanating therefrom in a "star shape." Glass repair kit 100 may comprise an opening 140 which may be oriented and aligned respectively above impact point 118 and cracks 120. In one embodiment, backing 110 may be removable and peeled away from bottom surface 136. Bottom surface 136 may be coated with an adhesive 114 completely surrounding opening 140 wherein applied pressure may fluidly seal pocket 102 from premature desiccation. In one embodiment, glass repair kit 100 may comprise a removable UV shield 112 adhered to top surface 134. UV shield 112 may be removed by peeling away or other like mechanism from top surface 134. Removal of backing 110 and UV shield 112 allows UV light to be transmitted within pocket 102 and interact with resin 106. In one embodiment, a user need only apply a relatively slight pressure, such as with their thumb or palm, to pocket 102 and porous material 104 to secrete resin 106 into impact point 118 and cracks or legs 120. The air tight seal 116 created by adhesive 114 between housing 108 and windshield 124 results in a pressure differential as the user presses on pocket 102 that causes resin 106 to flow through opening 140 into impact point 118 and spread into any cracks 120 radiating therefrom.

Figure 8:
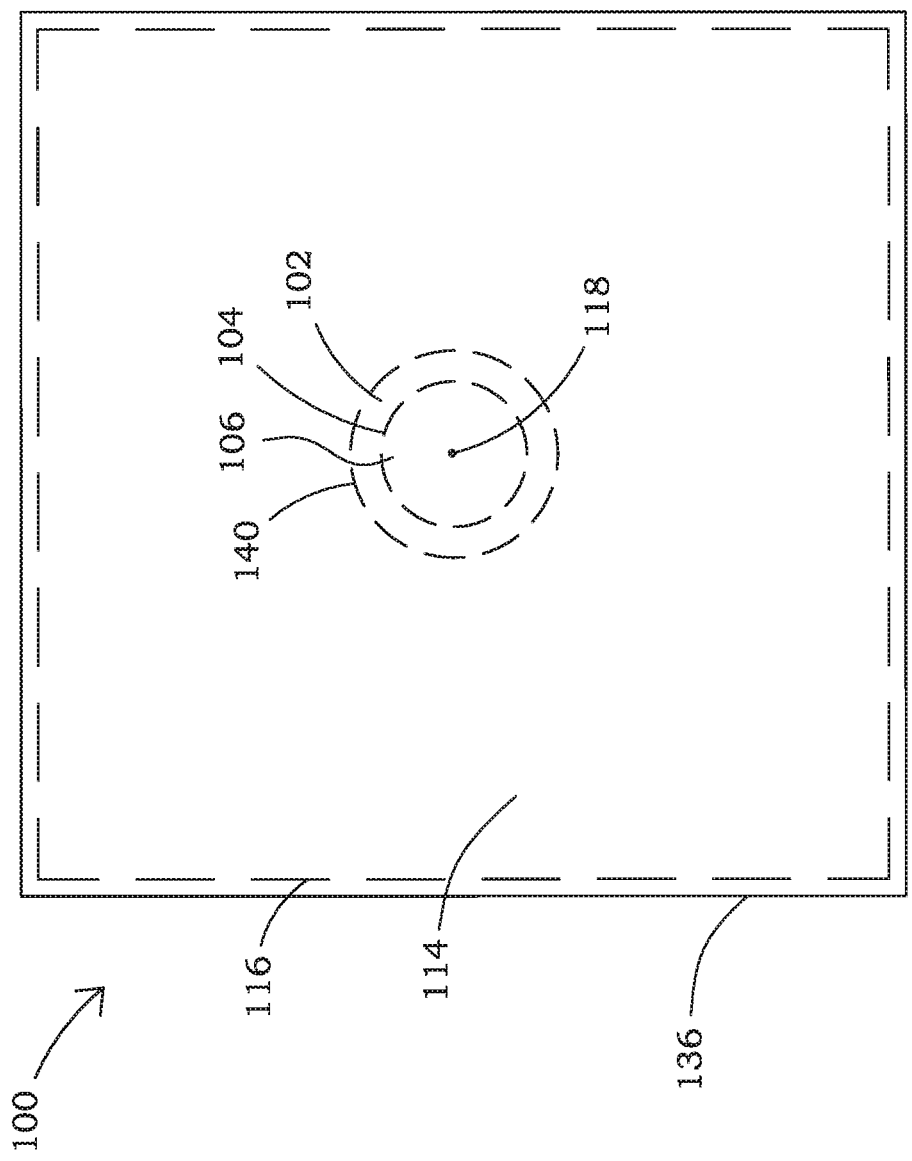
FIG. 8 is a bottom view showing a glass repair kit adhesively sealed and oriented above an impact point with cracks in a windshield in which the resin has had adequate time to cure and fully repair the damage in accord with one possible embodiment of the present invention.

Referring to FIG. 8, a bottom view is shown of glass repair kit 100 adhesively adhered and oriented above an impact point 118 with cracks 120 in a windshield 124 with an air tight seal 116 in which the resin 106 has had adequate time to cure and fully repair the damage in accord with one possible embodiment of the present invention. It will be seen that the resin has filled impact point 118 and cracks 120 so that they may appear invisible.

After a user has depressed pocket 102 thereby injecting resin 106 into impact point 118, resin 106 flows outward to fill cracks 120. UV light interacts with resin 106 after the resin has flowed to repair the damage in windshield 124. In one possible embodiment, the duration of the curing process may be approximately 5-10 minutes, but may be longer depending on the size and severity of any damage. Larger and deeper impact points 118 and longer, wider cracks 120 may accordingly require increased time to properly saturate and fill the damaged areas. As is shown in FIG. 8, where the cracks are no longer visible and the impact point appears much smaller, the required time has elapsed for resin 106 to completely fill the damaged area and cure. Resin 106 may comprise an organic material that approximates the refractive index of the laminated glass and, when cured, will seal the break or crack. The integrity of windshield 124 is restored thereby diminishing any further damage resulting from stresses placed on the windshield during vehicular use. Additionally, clarity through the repair portion has been restored allowing a driver to view through the repair without impediment. In some circumstances, after a repair is complete a remnant of damage may remain that is still visible after the repair is completed creating a cosmetic blemish.

As discussed above, an inspection of the area is recommended to determine if the repair is satisfactory. A visual and tactile inspection may be necessary to determine that resin 106 has cured level with outer layer 126 of windshield 124. If the repair is not level and resin protrudes from the windshield, a scraper may be used to remove excess resin and adhesive from the repaired area. If the repair has not fully filled in the damaged area leaving a depression or nick in the windshield, additional resin may be injected with a transparent film or tape placed over the affected area. UV light may cure the resin will additional time. Upon completion of the curing process, an additional inspection may be made to determine if the repair is satisfactory.

Referring to FIG. 9, a side cross-sectional view is shown of an impact point of a windshield 124 damaging the outer layer 126 of glass while the inner layer 130 of glass is undamaged in accord with one possible embodiment of the present invention. Modern consumer vehicles are equipped with safety glass windshields which do not shatter upon impact with various debris that come into contact with the glass. This type of glass protects driver's from minor injuries as well as more serious injuries that could occur from glass being catapulted in the direction of the driver resulting in bodily harm or losing control of a vehicle thereby causing a collision or wreck.

As shown in FIGS. 9 and 10, one possible embodiment of windshield 124 may comprise three layers of glass: an outer layer 126, a central layer 128, and an inner layer 130. Outer layer 126 is distal inner layer 130 and is exposed to the elements. Any object that impacts windshield 124 will first come into contact with outer layer 126. As the force of the impact is directed inward, central layer 128 acts to dissipate the shock from penetrating into or through inner layer 130. This advantageously eliminates the windshield from expelling shards of glass inward. Furthermore, because the impact point 118 is localized to outer layer 126, a repair can be made by injecting a clear adhesive resin under pressure which is then cured with ultraviolet light.

Referring to FIG. 10, an exploded perspective view is shown of the various layers of laminated windshield glass with light passing therethrough in accord with one possible embodiment of the present invention. Laminated glass is a type of safety glass which does not completely shatter into dangerous shards upon impact. Laminated glass is formed from two or more thin sheets of tempered glass that are fused to a rubber or plastic central layer, typically of polyvinyl butyral (PVB) or ethylene-vinyl acetate (EVA). The outer layers are independent, one on the outside of the vehicle and one on the inside of the vehicle. Outer layer 126 is distal inner layer 130 with central layer 128 sandwiched between. The central layer 128 acts by absorbing the shock from an impact and reduces the chance of breakage from small particles such as pebbles or the like forming impact points 118 or cracks 120.

If an object strikes the windshield glass with sufficient force, a chip or crack 120 may be formed. However, the impact point 118 is usually localized to only the outer layer 126 of the windshield 124. As described above, the inner layer 130 is located within the vehicle and is protected from breaking due to the central layer 128 acting as a central membrane absorbing the shock of the impact and thereby mitigating further damage to the inner layer 130 of glass. Windshield repair is a viable solution to repair the impact points or surface pits 118 that have damaged the outer layer 126 of the glass and prevent further damage such as cracks 120 spreading from the impact point 118 causing irreparable harm. When done properly, the strength and clarity is sufficiently restored for most safety related purposes.

As shown in FIG. 10, a path of light 132 is not impeded by any of the layers of glass. However, when debris or the like strikes a windshield, such as at relatively high speeds when driving, a surface pit 118 or crack 120 may be formed distorting and possibly distracting a driver. Additionally, such damage may also distort the path of light 132 decreasing a driver's ability to view the road, traffic, or other obstacles during transit. Therefore, it is paramount to seek a glass repair kit 100 which can alleviate any damage expediently while also being economical and user friendly.

In summary, during operation of one embodiment of the invention, UV shield 112 remains and backing 110 is removed. In another embodiment, UV shield 112 may also be removable. Housing 108 is positioned on the windshield with pocket 102 directly over the impact point 118. The housing is pressed and smoothed overall and around pocket 102 so that adhesive 114 seals around impact point 118 and opening 140. Once the housing has been pressed to make sure the adhesive is applied, then flexible pocket 102 can be pressed. This forces the resin out of porous material 104 into the cracks of the windshield to thereby prevent the cracks from continuing to run. The UV light will cure the resin with adequate time. In many cases, the resin will cure in a way that the cracks are no longer visible.

The glass repair kit may further comprise additional resin and an injector to inject the resin after removal of the housing as a touch up. Once injected, a piece of transparent tape or the like is placed over the crack wherein the additional resin will fill in any remaining cracks. The glass repair kit may further comprise a scraper to scrape any excess adhesive and resin to provide a smooth surface.

During manufacture of one embodiment, the glass repair kit construction may comprise providing a housing with an opening centrally located relative to the housing. A porous material comprising a resin may be placed within the opening and a film may be vacuum sealed relative to the top surface of the housing creating a pocket containing the porous material and the resin therein. An adhesive may be applied to the bottom surface of the housing and a backing adhered to the bottom surface sealing the porous material within from premature desiccation as well as from interacting with UV light. A UV shield may be provided and adhered to the top surface to block transmission of UV light from penetrating into the pocket to interact with the resin therein.

Figure 15:
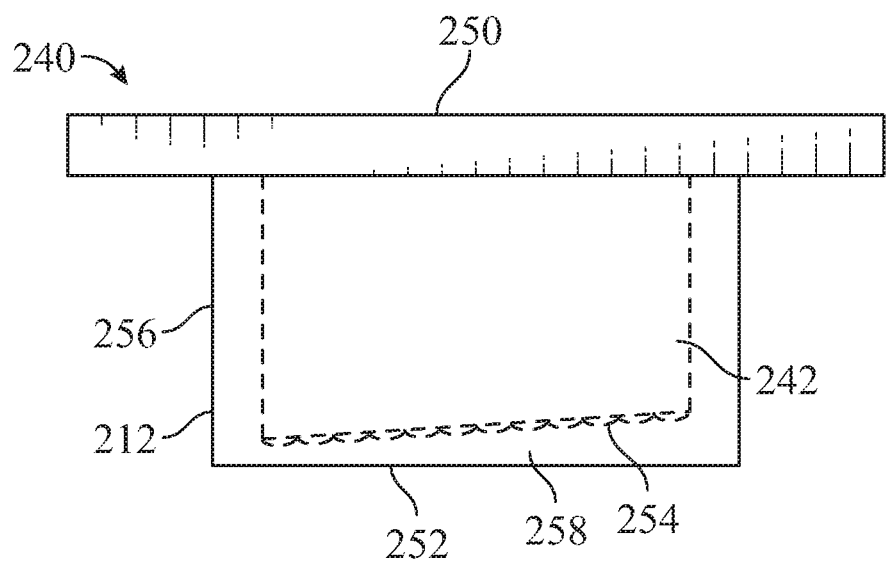
FIG. 15 is a side view of the compression member in accord with one possible embodiment of the present invention.
Figure 16:
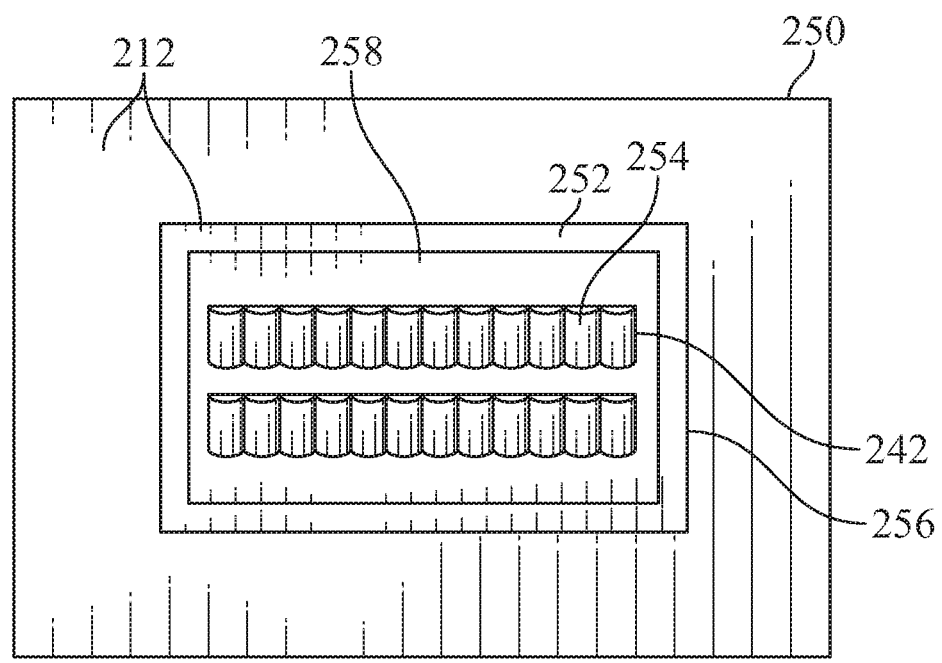
FIG. 16 is a top view of the compression member in accord with one possible embodiment of the present invention.
Figure 17:
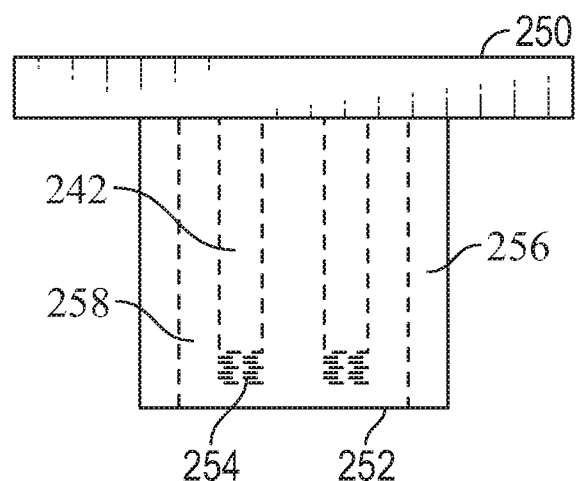
FIG. 17 is a front view of the compression member in accord with one possible embodiment of the present invention.
Figure 18:
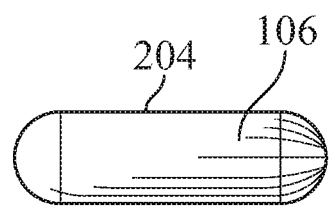
FIG. 18 is a side view of an embodiment of a container comprising resin therein in accord with one possible embodiment of the present invention.

Another possible embodiment of a glass repair kit is shown in FIGS. 11-24. This embodiment comprises three main components: a lower housing, a container comprising resin within, and a compression member. FIGS. 11-14 show the lower housing, FIGS. 15-17 show the compression member, FIG. 18 shows the container, and FIGS. 19-24 show the glass repair kit prepared for and in use.

Figure 11:
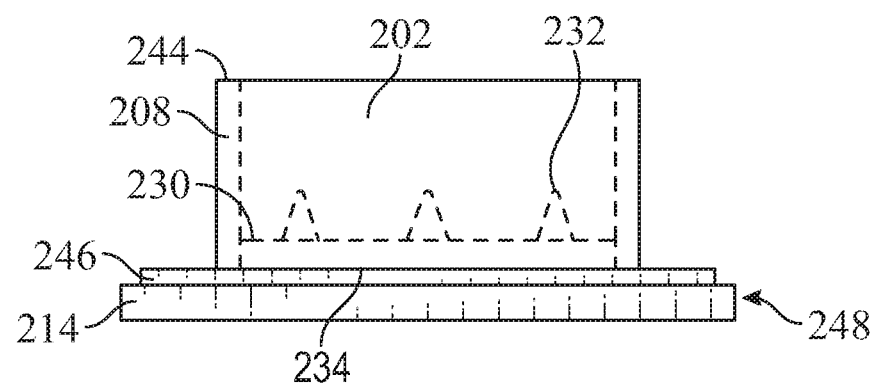
FIG. 11 is a side view of the lower housing in accord with one possible embodiment of the present invention.

Turning now to FIG. 11, a side view of the lower housing is shown in accord with one possible embodiment of the present invention. Lower housing 201 may comprise a housing 208. Lower housing 201 may also be referred to generally as a housing in the claims and may also be referred to as a lower member, assembly, rigid housing, or the like. Housing 208 may be comprised of a rigid material such as plastic, glass, polymers, or other like materials. Housing 208 is preferably transparent to allow UV light to transmit through the housing. The housing may also be translucent or other opacity such that UV light is readily able to be transmitted through the housing 208. Housing 208 extends generally upward in a perpendicular axis relative to base 248 as well as windshield 124. Housing 208 may comprise a rectangular shape but may also be square, circular, oval, or any other desired shape. Housing 208 comprises a wall protruding upward relative base 248. At the uppermost part of housing 208 is top surface 244. Top surface 244 may generally be flat and parallel to base 248, however it may be rounded or angled or other desired shapes.

Within housing 208, is an internal pocket or chamber 202. The chamber 202 is configured to accommodate a container 204 to be placed within as well as operable for a compression member to fit within the chamber 202. Chamber 202 is defined by a housing 208. A detailed description of a compression member will be discussed infra. Housing 208 comprises a bar extending the span of chamber 202. In one possible embodiment, bar 230 is a rigid member which is configured to fit between compression components 242. Bar 230 may have a width of twenty percent the width of housing 208 and chamber 202, or may be ten percent, or 5 percent or any size therebetween. Bar 230 may be positioned at the lower end of housing 208 away from top surface 244. Bar 230 further comprises points 232 which protrude outward from bar 230. Points 232 may also be referred to as cones, raised members, pointed members, piercing members, spikes, or the like. In the preferred embodiment, points 230 protrude upward relative bar 232 but in other possible embodiments may be directed in other directions such as at angles pointing in other directions or a plurality of directions, outwards, or other desired directions or combinations of directions such that points 232 are operable to release resin 106 from container 204. In one possible embodiment, points 232 are comprised of cones which extend from above bar 230 to the bottom of bar 230. Such a configuration may allow greater contact with container 204 when in operation to pierce, crush, or otherwise urge resin from container 204. In the embodiment shown, three points 232 are shown but a greater or lesser amount may be used. Points 232 and bar 230 are rigid and may be formed of the same material as housing 208.

Figure 12:
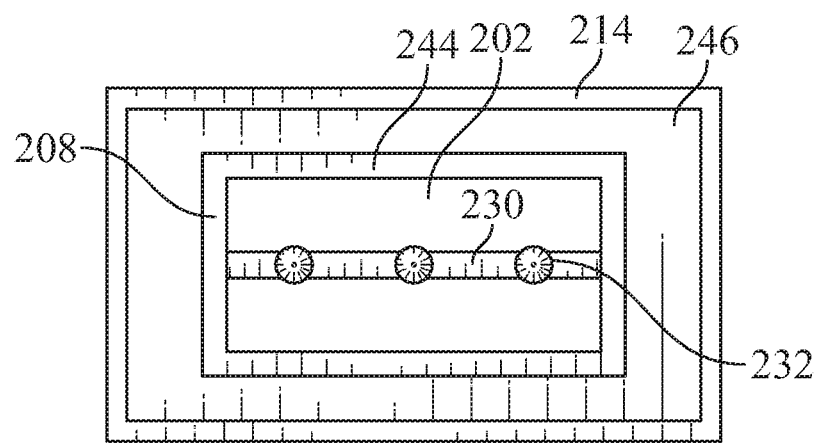
FIG. 12 is a top view of the lower housing in accord with one possible embodiment of the present invention.

Referring to FIG. 12, a top view of the lower housing is shown in accord with one possible embodiment of the present invention. Base 248 comprises bottom surface 246 and adhesive material 214. Bottom surface 246 extends laterally relative housing 208 to form a solid platform to apply glass repair kit 200 to windshield 124 when in use. In this embodiment, bottom surface 246 is preferably rectangular but may also be square, circular, oval, or any other desired shape. Bottom surface 246 is comprised of the same material as housing 208 and may be transparent, translucent, or any opacity that allows transmission of UV light through the surface. Bottom surface 246 is preferably rigid along with housing 208 to provide a structure with increased strength to allow for compression during operation. Adhesive material 214 is mounted below bottom surface 246 to allow adhesion on windshield 124 and prevents glass repair kit 200 from moving when placed over an impact point. Adhesive material 214 may be an adhesive foam, rubber, latex, gasket, cement, glue, or other material operable to adhere or affix glass repair kit 200 securely. As shown in this embodiment, bar 230 is centered within housing 208 and extends the span of the housing and chamber 202. Points 232 may be evenly spaced to provide sufficient surface area to pierce, cut, tear, or otherwise urge resin 106 from container 204 during compression upon container 204. The preferred embodiment comprises three points 232, however fewer or greater points may be used. Additionally, in other embodiments points 232 may be spaced or positioned unevenly or cover the surface of bar 230.

Figure 13:
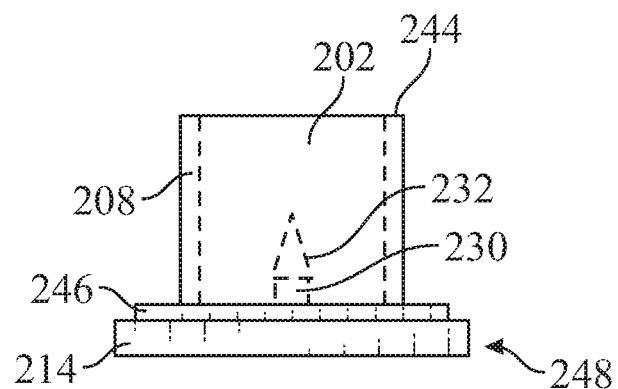
FIG. 13 is a front view of the lower housing in accord with one possible embodiment of the present invention.

Turning now to FIG. 13, a front view of the lower housing is shown in accord with one possible embodiment of the present invention. In this embodiment, points 232 are conical and extend to the top of bar 230. However, in other possible embodiments points 232 may extend to the bottom of bar 230 which may allow greater surface area to come into contact with container 204 during compression and provide greater force to release resin 106 which is contained within container 204. In other possible embodiments, points 232 may terminate at the top of bar 230 or at other heights relative to bar 230. Points 232 may also be positioned in additional locations such as on the sides or at angles on bar 230. The points and bar may span approximately one third of the width of chamber 202, but may cover greater or lesser area within housing 208. In one possible embodiment, housing 208 may be twice the height of points 232 and bar 230, but may be any height or width sufficient to allow placement of container 204 within housing 208 and securely hold container 204.

Figure 14:
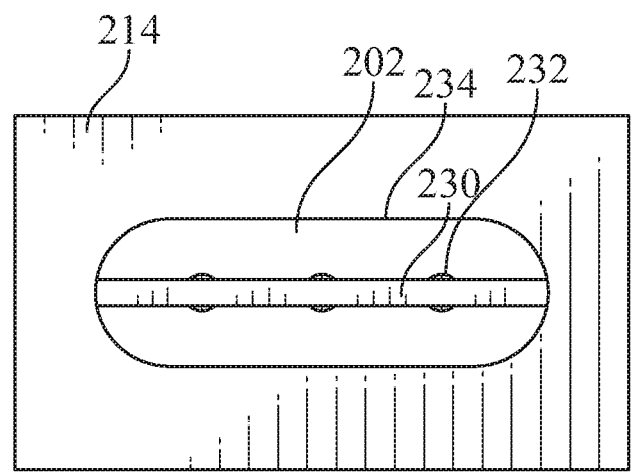
FIG. 14 is a bottom view of the lower housing in accord with one possible embodiment of the present invention.

Referring to FIG. 14, a bottom view is shown of the lower housing in accord with one possible embodiment of the present invention. Within bottom surface 246 is opening 234. Opening 234 may be centered with respective to housing 208, bottom surface 246, and adhesive material 214. Adhesive material 214 is preferably constructed with opening 234, however may be configured as a solid piece with a backing that may be removed to reveal opening 234. Adhesive material 214 may be configured to surround opening 234 and cover the bottom area of bottom surface 246. In other possible embodiments, adhesive material may surround less area such as the border of bottom surface 246, surround opening 234, or any other combination sufficient to adhere lower housing 201 adequately to prevent lateral movement after placement on a windshield. Adhesive material 214 prevents leakage of resin during operation. Opening 234 may extend the entirety of housing 208, however in other embodiments opening 234 may be smaller or greater in size while still being operable to allow ease of flow of resin 106 through opening 234 to fill any cracks 120 and impact points 118. In this embodiment, opening 234 is oblong and may have a corresponding shape and dimension as container 204. Opening 234 may in other embodiments also be square, rectangular, circular, or the like. The shape of opening 234 may vary to match the shape of lower housing 201 such as in other possible embodiments in which glass repair kit 200 is square, rectangular, circular, or other desired shape depending the on the application.

Referring now to FIGS. 15-17, a side, top, and front view are shown of the compression member 240 in accord with one possible embodiment of the present invention. Compression member 240 comprises top surface 250, bottom surface 252, and housing 256. Compression member 240 is preferably opaque so as to act as a UV shield 212. The UV shield blocks UV light from entering glass repair kit 200 when compression member 240 is placed on lower housing 201 during operation. Compression member 240 is a rigid structure such that it is operable to withstand a user compressing, pressing upon, or otherwise directing pressure onto the member during use. Compression member 240 may be constructed of a rigid material such as plastic, glass, polymers, or other like materials. Top surface 250 may be generally flat and rectangular and radiate or extend beyond housing 256. This allows for a greater area to shield from UV light as well as provides a more user friendly surface for a user to grasp or manipulate compression 240 onto or off of lower housing 201. However, top surface 250, housing 256, and bottom surface 252 are not confined to a rectangular shape and can be any other desired shape such as circular, square, or the like. Housing 256 extends outward perpendicular to top surface 250 when viewed with respect of its position relative to use for operation. Housing 256 is sized such that it fits tightly or snugly around housing 208 of lower housing 201 and completely covers housing 208 such that bottom surface 252 contacts bottom surface 246 (See FIGS. 21 and 23-34). Housing 256 also acts as a UV shield 212 so that in combination with top surface 250 each acts to block UV light from penetrating through its surface.

Within housing 256 is compression chamber 258 which is sized to contain container 204. Compression chamber 258 is generally a hollow portion within the confines of housing 256, therefore housing 256 has dimension operable to allow container 204 to fit within as well as to slip over and engage tightly against housing 208 of lower housing 201. Within housing 256 is also internal compression component 242 which may also be referred to as an internal crushing member. In the embodiment shown, two internal compression components 242 are used however, greater or fewer could be used. Internal compression components 242 extend outward or downward from top surface 250 along the same axis as housing 256. Each internal compression component 242 may be rectangular and have a length substantially that of housing 256. Sufficient space around the exterior of internal compression components 242 and the internal sides of housing 256 are configured to accommodate housing 208 within compression chamber 258.

Each internal compression component 242 preferably incorporates a slight angle or taper along the bottom most surface relative bottom surface 252. The angle or slope may be approximately five degrees to 15 degrees or up to 35 degrees. However, different angles may be used or no angle but rather a straight surface may be used. In addition, in other possible embodiments, the internal compression components may be round, semicircular, other shapes and of different configurations of numbers while still allowing sufficient compression of container 204 during operation. Along the bottom most surface of internal compression component 242 are a plurality of ridges 254. The number of ridges 254 preferably span the length of internal compression component 242, however fewer may be used. Each ridge 254 is operable to provide a crushing, tearing, or piercing of container 204 when downward pressure is applied. The ridges 254 may also be pointed, rounded, or other like shapes or structures.

In a preferred embodiment, internal compression components 242 are configured with a space between each component such that bar 230 and points 232 may fit between. Each internal compression component 242 may be parallel and when compression member 240 is placed upon bottom housing 201 then each component 242 is also parallel to bar 230 and straddle bar 230.

Turning to FIG. 18, a side view is shown of a container 204 comprising resin 106 therein in accord with one possible embodiment of the present invention. In one possible embodiment container 204 may be a capsule with resin 106 within. Capsules are well known to hold various liquids, gels, or the like within. Other containers may used such as sponges, permeable materials, bags, sacks, pouches, packets, or the like. In one possible embodiment, container 204 is operable to open, tear, puncture or otherwise to release resin 106 which may then be urged into an impact point 118. Container 204 may be transparent to allow UV light to penetrate the surface and interact with the resin 106 within. In one possible embodiment, capsule 204 may be oblong, however other shapes may be used such that they are operable to fit within housing 208. In one possible embodiment, no container may be used but rather chamber 202 is sealed and comprises resin 106 within wherein compression member 240 may urge resin from within chamber 202 into an impact point.

Figure 19:
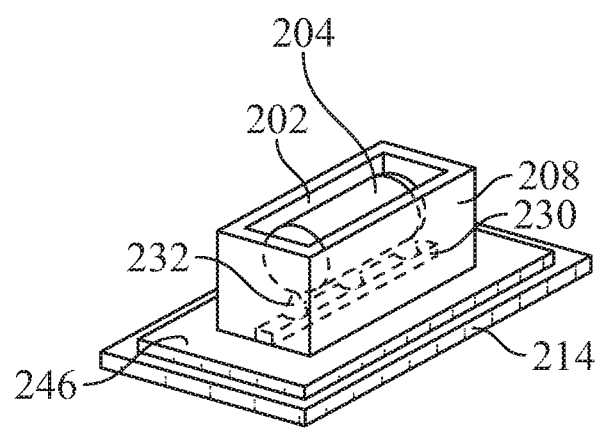
FIG. 19 is a prospective view of the lower housing with a container placed therein prior to use in accord with one possible embodiment of the present invention.
Figure 20:
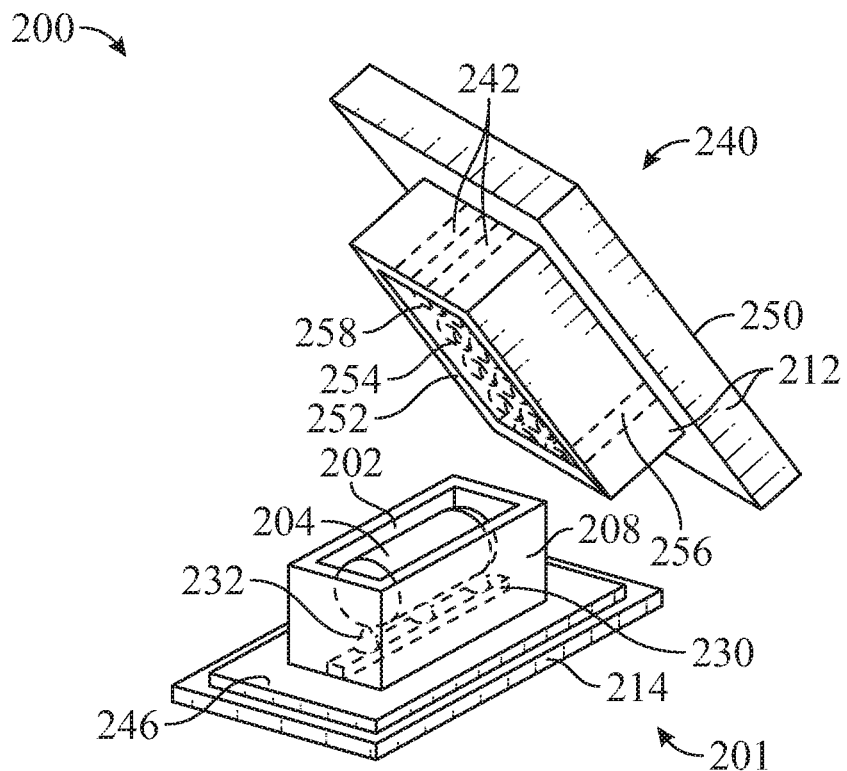
FIG. 20 is a perspective view of the glass repair kit prepared for use in accord with one possible embodiment of the present invention.
Figure 21:
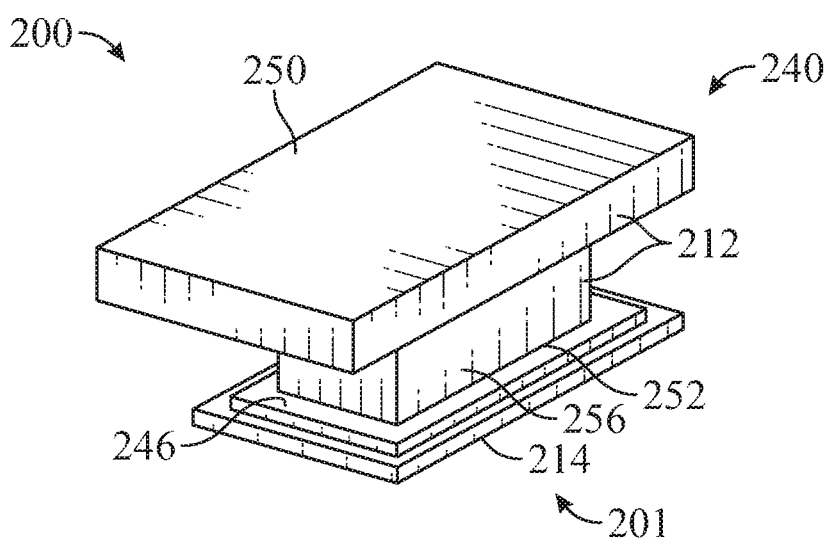
FIG. 21 is a perspective view of the glass repair kit with the compression member placed fully onto the lower housing in accord with one possible embodiment of the present invention.

Referring to FIGS. 19-21, prospective views of the lower housing 201 are shown with a container 204 placed therein prior to use in accord with one possible embodiment of the present invention. Container 204 is sized to fit snugly within chamber 202 of housing 208. Container 204 may be placed inside chamber 202 by a user in preparation for use. The bottom of container 204 may placed or positioned adjacent points 232. A user may position or secure lower housing 201 on a windshield 124 prior to inserting or placing container 204 or may position lower housing 201 with container 204 already in place. In one possible embodiment, container 204 substantially fills the empty space within chamber 202 and come into contact with each interior side of housing 208.

As shown in FIG. 20, after container 204 has been inserted into lower housing 201, compression member 240 may be positioned into place. Compression member 240 is easy to place onto lower housing 201 where housing 256 operably interfaces with housing 208 with housing 208 fitting internally. Internal compression components 242 inside housing 256 will come into contact with container 204.

After each respective member has been aligned with lower housing 201 and compression member 240 operably connected, a user may apply pressure to top surface 250 thereby providing a compressive force. Compression member 240 may be pressed until bottom surface 242 of compression member 240 comes into contact with bottom surface 246 of lower housing 201. Compression components 242 compress, push, or engage the top of container 204. Upon compression of container 204, container 204 is driven downward into points 232 and bar 230. Upon completion of compression, internal compression components 242 have driven container 204 into points 232 to thereby release resin through opening 234 of lower housing 201. In one possible embodiment, compression components 242 will then be parallel to and on opposite sides of bar 232. Compression member 240 then acts as a UV shield 212 as the resin 106 is released and urged throughout impact point 118. It is important during this stage that UV shield 212 does not allow transmission of UV light into lower housing 201 as resin 106 flows to prevent premature hardening of the resin. The resin 106 may take approximately 5 to 10 minutes to adequately flow and fill any impact points 118 and cracks 120. After which, UV shield 212 may be removed to allow UV light to interact with the resin and cure. In a preferred embodiment, compression member 240 acts as UV shield 212 and therefore removal of compression member 240 also removes UV shield 212. However, other possible embodiments may comprise a separate UV shield 212 which may be removed while compression member 240 may be operable to allow transmission of UV light within or compression member 240 may also be removed separately.

Figure 22:
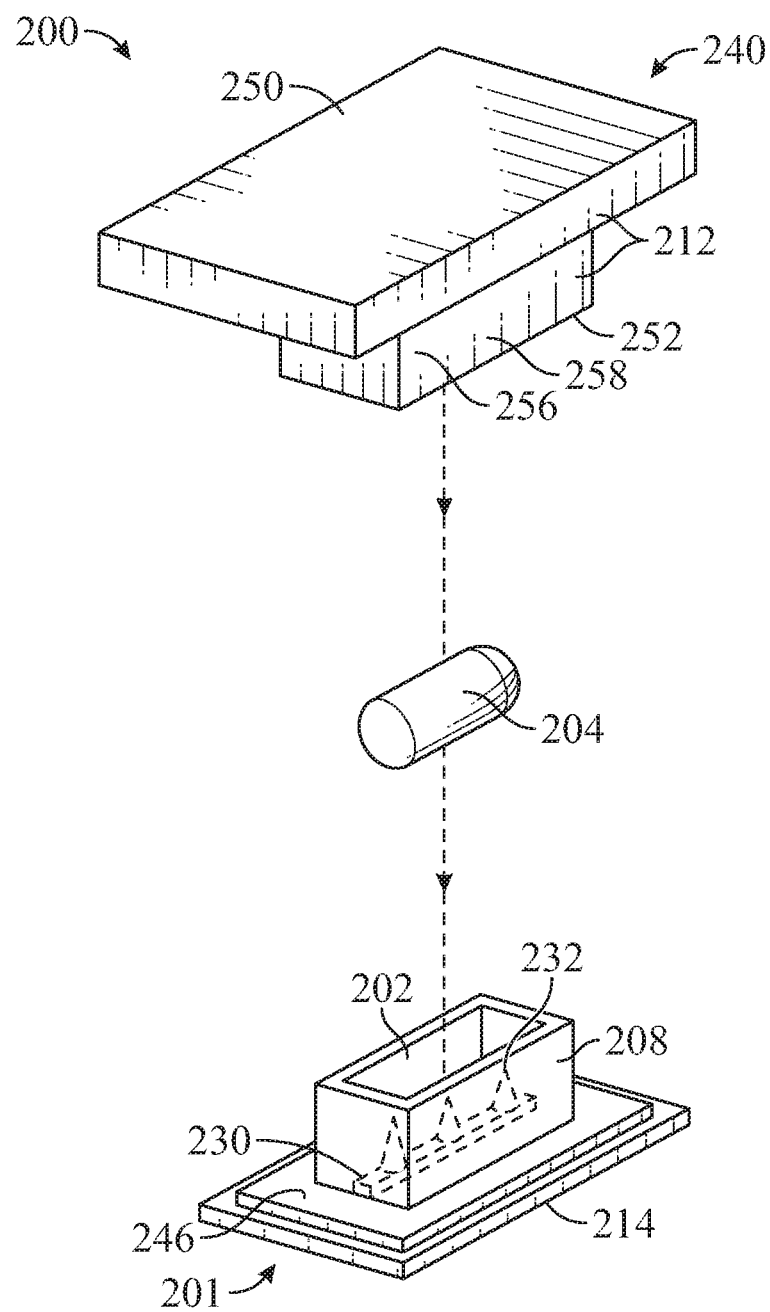
FIG. 22 is an exploded view of the glass repair kit in accord with one possible embodiment of the present invention.

Turning now to FIG. 22, an exploded view of the glass repair kit 200 is shown in accord with one possible embodiment of the present invention. Glass repair kit 200 comprises three main pieces: compression member 240, container 204, and lower housing 201. In one possible embodiment, each piece may be separable so that lower housing 201 may be properly positioned prior to inserting container 204 or placing compression member 240. Lower housing 201 is preferably transparent which additionally allows for ease of placement over an impact point 118. However, in other possible embodiments, container 204 may be pre-installed and compression member 240 may be constructed such that it is operably interconnected to lower housing 201 as one complete unit or any combination of the like.

Compression member 240 and lower housing 201 may be constructed through 3-D printing, injected molds, milling, or other like construction methods. Additionally, each piece may be monolithically formed or constructed of separate pieces which may be secured together after such as during construction or prior to use. This creates a repair kit that is both easy and economical to manufacture allowing for an easy to use glass repair kit for users who have little or no skill in window repair, that is highly portable, and is economical. In the embodiment shown, it will be appreciated the simple construction allows a user to simply place lower housing 201 onto the proper place on the windshield, insert a container 204 into lower housing 201, place compression unit 240 down onto and over lower housing 201, and apply compression to use glass repair kit 200.

Figure 23:
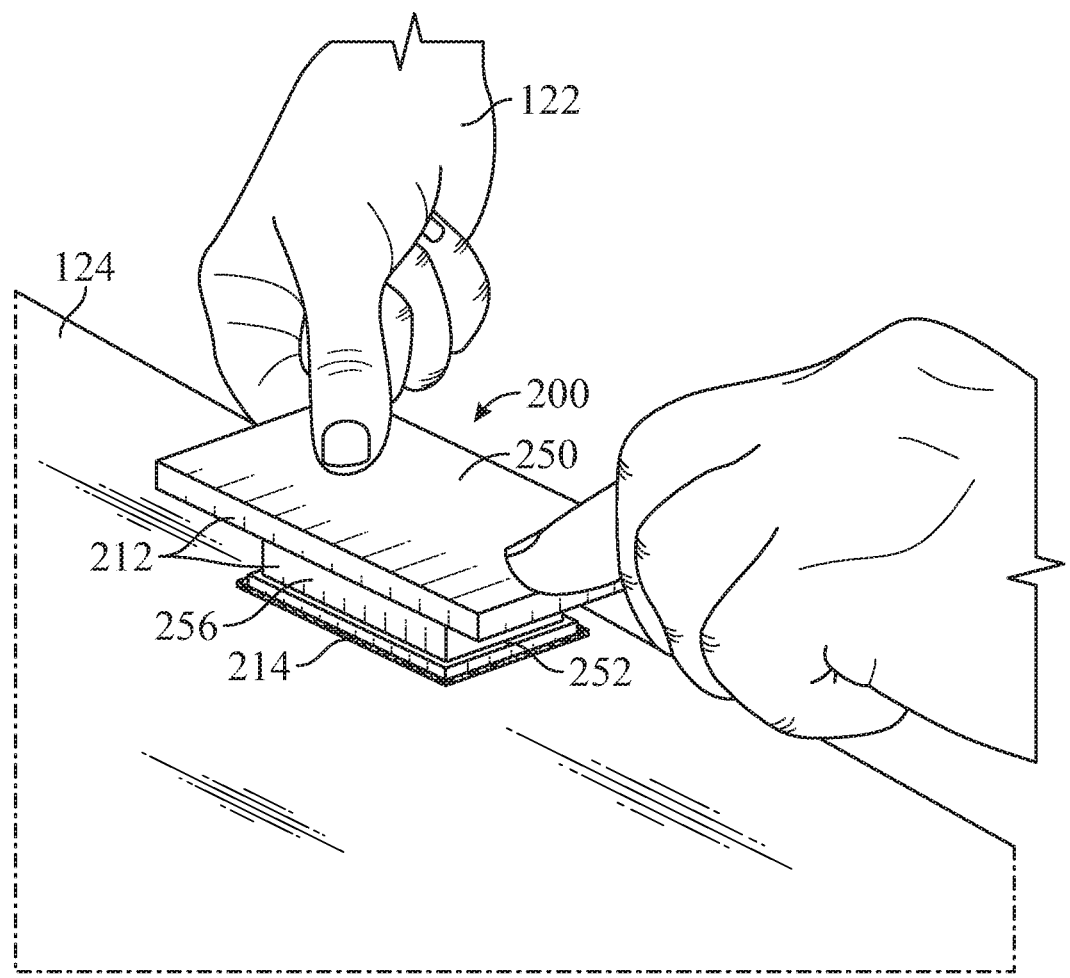
FIG. 23 is a perspective view showing a user placing a glass repair kit onto a damaged windshield in accord with one possible embodiment of the present invention.

FIG. 23 is a perspective view showing a user 122 placing a glass repair kit 200 onto a damaged windshield in accord with one possible embodiment of the present invention.

After preparing/cleaning the windshield or glass surface 124 by removing any excess glass or debris, user 122 may place glass repair kit 200 with chamber 202 directly over impact point or surface pit 118. In one possible embodiment, user 122 then may apply adhesive material 214 adjacent bottom surface 246 of housing 208 to windshield 124. Bottom surface 246 comprises an adhesive material 214 that may sufficiently adhere glass repair kit 200 to windshield 124. Adhesive material 214 is operable to provide a tight seal around impact point 118 and may also seal over any cracks or legs 120. A seal over impact point 118 allows the resin to flow into the impact point and throughout the cracks even if glass repair kit 200 is not covering the cracks 120 emanating from impact point 118. Adhesive material 214 preferably forms a fluid tight seal around opening 234 so that all resin is forced into the cracks of the window preferably when compression member 240 is compressed. User 122 need merely provide a slight downward pressure relative to windshield 124 along the top surface 250 of compression member 240. By creating an air tight seal, a vacuum may be formed allowing resin 106 to flow from container 204 into impact point 118 and spread through any cracks 120 (See FIG. 24) that may be present. In other words, higher pressure from the chamber, compression from the downward applied pressure, or a combination forces the resin into any cracks or legs in the glass. In this embodiment, no additional tools or apparatus are necessary to place, align, orient, adhere, nor to create a vacuum relative to glass repair kit 200 and windshield 124. Additionally, a seal prevents any resin 106 from leaking or spilling out during operation so that the resin flows throughout the damaged area.

Figure 24:
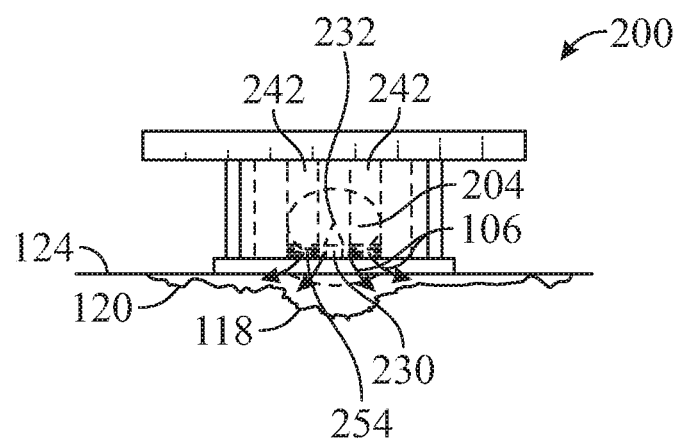
FIG. 24 is a side view showing a glass repair kit in which the compression member has been pressed to apply pressure on the container thereby releasing the resin into the damaged windshield in accord with one possible embodiment of the present invention.

Opening 234 may be placed directly over impact point 118 so as to also align container 204 to be above the impact point 118 (See FIG. 24). The remaining portion of bottom surface 246 may also be positioned or aligned to cover any cracks or legs 120 which emanate from impact point 118. Glass repair kit 200 is preferably sized to cover a damaged area of a windshield approximately 1.75" or less, however larger sized glass repair kits may be used. For example, the glass repair kit 200 may be from one to two inches in size, or may be from one to four inches in size, or may be from one to five inches in size, but may be larger or smaller.

UV light is required to cure resin 106, therefore UV shield 212 may be removed to allow UV light to penetrate into chamber 202 and interact with resin 106 after sufficient time has elapsed for the resin 106 to flow. This time may range from approximately 5-15 minutes. UV shield 212 may be a rigid plastic or other such material thereby allowing removal from housing 208. UV shield 212 may be comprised of an opaque material which prevents UV light from penetrating the surface. In the event UV shield 212 does not cover all the cracks from exposure to UV light, a user may use a cloth, the packaging, or any other suitable means to prevent premature exposure of resin 106 to UV light. In one possible embodiment, UV shield 212 may be removed by lifting compression member 240 from lower housing 201. UV shield 212 may be removed after resin 106 has had sufficient time to flow throughout the impact point and cracks. The entire apparatus may be removed after the resin has filled in the damaged area in and allowed UV light to be transmitted to 106 resin to cure. The time to cure may be in the range of approximately 5-15 minutes. In some possible embodiments, adhesive material 214 and the engagement of compression member 240 and lower hosing 201 may be sufficiently secured to the windshield to allow a user to place a glass repair kit 200 on a windshield and allow the resin 106 to flow while still operating the vehicle. A user 122 could then pull over when convenient and safe, quickly remove the UV shield, and continue on while the resin cures. Such a configuration would provide ample flexibility and reduce time lost.

FIG. 24 is a side view showing a glass repair kit in which the compression member 240 has been pressed to apply pressure on the container 204 thereby releasing the resin 106 into the impact point 118 of damaged windshield 124 in accord with one possible embodiment of the present invention. For this reason, compression member 240 has been placed in a fully depressed position in which compression member 240 covers lower housing 201 after compression. The user may compress compression member 240 onto lower housing 201 using their thumb or other fingers.

Housing 208 may be adhered to windshield 124 by adhesive material 214 which may be coated to bottom surface 246. Other means of securing housing 108 to windshield may also be used as discussed previously. Housing 208 may be rigid and comprise a rigid or semi-rigid bottom surface 246 operable to conform to the curvature of windshield 124. Adhesive material 214 may be adhered to windshield 124 through slight pressure applied by a user 122 around the periphery of bottom surface 246 whereby the adhesive may be sufficient to seal off any air from entering into the impact point 118 or any crack 120 which emanates therefrom. The seal also prevents any resin from leaking out during operation. This is highly beneficial and eliminates the need for additional tooling typically required in commercial repair centers. The user will preferably press bottom surface 246 downward all around housing 208 and chamber 202 to make sure that adhesive material 214 seals completely around chamber 202 and opening 234.

Once a seal is formed around chamber 202 and opening 234, and preferably over around entire bottom surface 246 of lower housing 201, with adhesive material 214, a user 122 may apply pressure to with compression member 240 to compress chamber 202 whereby container 204 is also compressed. Due to the seal which prevents resin from flowing elsewhere, the resin 106 contained within container 204 will then flow through opening 234 and into impact point 118. A relative vacuum, or flow from higher pressure to lower pressure, created by the air tight seal from adhering glass repair kit 200 to windshield 124 further allows resin 106 to flow freely through any remaining cracks or legs 120. When compared to a typical commercial repair center that requires additional heavy tooling, a decreased amount of pressure is required to be applied to windshield 124 thereby mitigating any further damage or cracking from occurring. Greater pressure is often required when utilizing commercial tools and creates a risk of a crack "running" which increases damage, time, and costs associated with repairing a windshield.

As discussed herein, UV shield 212 may be removed from lower housing 201, preferably after lower housing 201 is adhered to windshield 124 and the resin 106 has flowed into the damaged area. Compression member 240 may comprise UV shield 112 and be constructed of a rigid material such as plastic or rubber or other suitable material which may be placed onto lower housing 201. UV shield 212 may lifted or slid off to be removed from lower housing 201 thereby exposing chamber 202 to UV light. UV light is transmitted into chamber 202, housing 208, and through opening 234, and reacts with resin 106 to begin the curing process. Resin 106 may typically cure within approximately 5 to 10 minutes, but may require more or less time as the size of the impact point and cracks are increased or decreased.

After user 122 has compressed compression member 240, resin 106 will be urged into the impact point and cracks due to the compression and pressure differential of the vacuum created by the seal from the adhesive material 214 between bottom surface 246 and windshield 124. After allowing the resin 106 to flow and cure, user 122 may remove glass repair kit 200 as described below.

In one embodiment, after sufficient time has passed to allow resin 106 to flow and cure, a user 122 may remove glass repair kit 200 by peeling, scraping, or other like means from windshield 124. A razor blade may be used to easily remove glass repair kit 200 from the windshield and allow a user to maintain a smooth glass surface. Due to the flat surface of the windshield and structure of housing 208, resin 106 may leave a relatively smooth surface on the windshield with any excess recess remaining in chamber 202 being also flush relative bottom surface 246 and opening 234 of lower housing 201. After removal, user 122 may then visually inspect the repair to determine that the impact point and cracks have been sufficiently repaired. A user 122 may also physically inspect the repair such as by carefully running their finger over, using a scraper or flat edge, or other like means to ensure an acceptable repair. In one embodiment, glass repair kit may include a receptacle containing additional resin, scraper, and transparent film such as tape. In the event user 122 determines a repair is not sufficient, such as cracks remain visible or the resin is not even relative to the outer layer of the glass, user 122 may utilize the receptacle to place additional resin. Typically only one drop of resin is necessary, but may be more, for the area that has been determined to be insufficient. After which, clear film or tape may be placed over the area and allow the additional resin to flow into the cracks. UV light may then react with the additional resin to cure. Curing time may typically range from a few seconds to 5-10 minutes, but more time may be necessary depending on the size of the remaining damage area. After sufficient time has passed, user 122 may then remove the clear film by peeling and/or utilizing a scraper to remove any leftover adhesive or excess resin to create a smooth surface on the windshield.

The foregoing description of the preferred embodiments of the invention has been presented for purposes of illustration and description only. It is not intended to be exhaustive or to limit the invention to the precise form disclosed; and obviously many modifications and variations are possible in light of the above teaching. While redundant, different methods discussed above could be utilized together if desired. Such modifications and variations that may be apparent to a person skilled in the art are intended to be included within the scope of this invention as defined by the accompanying claims.

In general overview of the drawings, it will be understood that such terms as "up," "down," "vertical," and the like, are made with reference to the drawings and/or the earth and that the devices may not be arranged in such positions at all times depending on variations in operation, transportation, mounting, and the like. As well, the drawings are intended to describe the concepts of the invention so that the presently preferred embodiments of the invention will be plainly disclosed to one of skill in the art but are not intended to be manufacturing level drawings or renditions of final products and may include highly simplified conceptual views and exaggerated angles, sizes, and the like, as desired for easier and quicker understanding or explanation of the invention.

One of skill in the art upon reviewing this specification will understand that the relative size, orientation, angular connection, and shape of the components may be greatly different from that shown to provide illuminating instruction in accord with the novel principals taught herein. As well, connectors, component shapes, and the like, between various housings and the like may be oriented or shaped differently or be of different types as desired. Many additional changes in the details, components, steps, and organization of the system and method, herein described and illustrated to explain the nature of the invention, may be made by those skilled in the art within the principle and scope of the invention. It is therefore understood that within the scope of the appended claims, the invention may be practiced otherwise than as specifically described.

The invention claimed is:

1. A glass repair kit to repair an impact point in safety glass, comprising:
    a housing, said housing comprising a wall and a bottom surface, said wall extending from said bottom surface whereby in operation after placement of said housing on said safety glass then said bottom surface is adjacent said safety glass;
    an adhesive operable to adhere said bottom surface to said safety glass;
    a chamber formed inside of said housing defined by said wall for placement adjacent said safety glass to permit resin to flow from said chamber to said safety glass through an opening, whereby when said adhesive is adhered to said safety glass and said bottom surface then a seal is formed between said housing and said safety glass around said opening;
    a compression member to urge said resin into said impact point in said safety glass during operation of said glass repair kit, said resin being operable to flow into said impact point and cure in response to UV light;
    a UV shield for said compression member, said UV shield being operable to block transmission of UV light to said resin within said chamber; and
    a container configured to be housed within said chamber wherein said container contains said resin within, said container is compressible to release said resin upon compression with said compression member, and said resin is operable to flow from said container into said impact point of said safety glass through said opening.

2. The glass repair kit of claim 1, further comprising said compression member being separable from said housing, said housing being rigid, said housing being operable for transmission of UV light through said housing.

3. The glass repair kit of claim 2 further comprising said compression member being rigid and fitting around said housing.

4. The glass repair kit of claim 1, further comprising said UV shield being removable from said housing, wherein when said UV shield is removed then said UV light is capable of transmission through said housing and into said chamber.

5. The glass repair kit of claim 4, further comprising said UV shield being formed on said compression member, said compression member being removable from said housing.

6. The glass repair kit of claim 1 further comprising said container being a capsule, said capsule being operable to be inserted into said housing.

7. The glass repair kit of claim 1 further comprising a bar mounted in said chamber, said bar being engageable with said container to release said resin upon contact with said bar in response to movement of said compression member.

8. The glass repair kit of claim 7 further comprising said bar comprising raised members, said raised members protruding from said bar, said raised members configured to pierce said container.

9. The glass repair kit of claim 7 further comprising said compression member comprising at least one internal compression component.

10. The glass repair kit of claim 9 further comprising said compression member comprising said at least one internal compression component being positioned to guide said container to contact said bar during compression, said at least one internal compression component being insertable to said chamber, said at least one internal compression component operable to provide compression to said container.

11. The glass repair kit of 9 further comprising said at least one internal compression component comprising two internal compression components, said two internal compression components having a length substantially the length of said bar, said two internal compression components being positioned parallel relative said bar and spaced to accept said bar between said two internal compression components upon compression, said two internal compression components having a top surface which is angled between zero and thirty five degrees relative each end of each said two internal compression components, and said top surface of said two internal compression components comprising ridges operable to pierce said container upon compression.

12. A glass repair kit to repair an impact point in safety glass, comprising:
    a housing, said housing comprising a wall and a bottom surface, said wall extending from said bottom surface whereby in operation after placement of said housing on said safety glass then said bottom surface is adjacent said safety glass;
    an adhesive operable to adhere said bottom surface to said safety glass;
    a chamber formed inside of said housing defined by said wall for placement adjacent said safety glass to permit resin to flow from said chamber to said safety glass through an opening, whereby when said adhesive is adhered to said safety glass and said bottom surface then a seal is formed between said housing and said safety glass around said opening;
    a compression member to urge said resin into said impact point in said safety glass during operation of said glass repair kit, said resin being operable to flow into said impact point and cure in response to UV light, said compression member comprising a compression member surface that slidingly engages an outer surface of said wall, said outer surface being outside of said chamber; and
    a UV shield for said compression member, said UV shield being operable to block transmission of UV light to said resin within said chamber.

13. The glass repair kit of claim 12 further comprising a container configured to be housed within said chamber wherein said container contains said resin within, said container is compressible to release said resin upon compression, and said resin is operable to flow from said container and be urged into said impact point of said safety glass through said opening.

14. The glass repair kit of claim 13 further comprising a bar being mounted in said chamber, said bar being engageable with said container to release said resin upon contact with said bar in response to movement of said compression member.

15. The glass repair kit of claim 14 further comprising said bar comprising raised members, said raised members protruding from said bar, said raised members configured to pierce said container.

16. The glass repair kit of claim 14 further comprising said compression member comprising at least one internal compression component, said at least one internal compression component being positioned to guide said container to contact said bar during compression, said at least one internal compression component being insertable to said chamber, said at least one internal compression component operable to provide compression to said container on an opposite of said bar.

17. The glass repair kit of 16 further comprising said at least one internal compression component comprising two internal compression components, said two internal compression components having a length substantially the length of said bar, said two internal compression components being positioned parallel relative said bar and spaced to accept said bar between said two internal compression components upon compression, said two internal compression components having a top surface being angled between zero and thirty five degrees relative each end of each said two internal compression components, and said top surface of said two internal compression components comprising ridges operable to pierce said container upon compression.

18. A glass repair kit to repair an impact point in safety glass, comprising:

a housing, said housing comprising a wall and a bottom surface, said wall extending from said bottom surface whereby in operation after placement of said housing on said safety glass then said bottom surface is adjacent said safety glass;

an adhesive operable to adhere said bottom surface to said safety glass;

a chamber formed inside of said housing defined by said wall for placement adjacent said safety glass to permit resin to flow from said chamber to said safety glass through an opening, whereby when said adhesive is adhered to said safety glass and said bottom surface then a seal is formed between said housing and said safety glass around said opening, said chamber being formed without a valve on said wall that connects to air outside of said chamber;

a compression member to urge said resin into said impact point in said safety glass during operation of said glass repair kit, said resin being operable to flow into said impact point and cure in response to UV light; and a UV shield for said compression member, said UV shield being operable to block transmission of UV light to said resin within said chamber.

19. The glass repair kit of claim 18 further comprising a capsule containing said resin, said capsule being operable to be inserted into said housing.

20. The glass repair kit of claim 19 further comprising said capsule being engageable with said compression member to release said resin in response to movement of said compression member.

\* \* \* \* \*